United States Patent
Watabu et al.

(10) Patent No.: US 9,543,882 B2
(45) Date of Patent: Jan. 10, 2017

(54) AC MOTOR DRIVE SYSTEM

(71) Applicant: Mitsubishi Electric Corporation, Tokyo (JP)

(72) Inventors: Kazuyoshi Watabu, Tokyo (JP); Akiko Tabuchi, Tokyo (JP); Tetsuya Okuda, Tokyo (JP); Yoshinori Kanda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/915,666

(22) PCT Filed: Oct. 2, 2013

(86) PCT No.: PCT/JP2013/076873
§ 371 (c)(1),
(2) Date: Mar. 1, 2016

(87) PCT Pub. No.: WO2015/049746
PCT Pub. Date: Apr. 9, 2015

(65) Prior Publication Data
US 2016/0226423 A1    Aug. 4, 2016

(51) Int. Cl.
*H02P 27/00* (2006.01)
*H02P 27/06* (2006.01)
(Continued)

(52) U.S. Cl.
CPC .............. *H02P 27/06* (2013.01); *H02J 7/007* (2013.01); *H02J 7/34* (2013.01); *H02M 5/458* (2013.01); *H02M 5/4585* (2013.01)

(58) Field of Classification Search
CPC ..... B60L 11/1861; B60L 2210/40; B60L 1/20; B60L 11/1811; H02P 27/06; H02P 3/14; H02M 1/36; H02M 7/53871; H02M 3/155; H02M 5/458; H02M 7/797; G05F 5/00
(Continued)

(56) References Cited

U.S. PATENT DOCUMENTS 6,081,104 A * 6/2000 Kern ................. H02J 9/065
                                                320/101
6,907,948 B2 * 6/2005 Wakashiro ............... B60K 6/48
                                                180/65.1
(Continued)

FOREIGN PATENT DOCUMENTS

JP     08-140394 A    5/1996
JP     2002-374700 A  12/2002
(Continued)

OTHER PUBLICATIONS

International Search Report for PCT/JP2013/076873 dated Dec. 10, 2013.

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

When regenerative power from an AC motor via an inverter exceeds a predetermined power threshold, a charging/discharging control unit, which outputs a control signal for controlling the inverter on the basis of a DC bus voltage value and a charging/discharging current value, causes a power storage device to be charged such that the DC bus voltage value becomes a voltage threshold corresponding to the power threshold and causes a charging current at a start time of charging to the power storage device to start from a charging current value that is based on a DC bus voltage value.

6 Claims, 13 Drawing Sheets

(51) Int. Cl.
*H02J 7/34* (2006.01)
*H02J 7/00* (2006.01)
*H02M 5/458* (2006.01)

(58) Field of Classification Search
USPC .................. 318/139, 504, 400.26, 400.3,
400.31,318/722, 430, 450, 456, 507
See application file for complete search history.

(56) References Cited

U.S. PATENT DOCUMENTS

| | | | |
|---|---|---|---|
| 7,017,377 B2 | 3/2006 | Hosoito et al. | |
| 7,612,518 B2 | 11/2009 | Iura et al. | |
| RE41,303 E * | 5/2010 | Komatsu | B60L 3/0023 |
| | | | 318/434 |
| 7,934,573 B2 * | 5/2011 | Fassnacht | B60K 6/48 |
| | | | 180/65.21 |
| 2009/0218976 A1 | 9/2009 | Iwashita et al. | |
| 2013/0154531 A1 | 6/2013 | Furutani et al. | |
| 2014/0210389 A1 * | 7/2014 | Niwa | H02P 3/12 |
| | | | 318/400.3 |

FOREIGN PATENT DOCUMENTS

| | | | |
|---|---|---|---|
| JP | 3533091 B2 | 5/2004 | |
| JP | 2005-184902 A | 7/2005 | |
| JP | 2009-207305 A | 9/2009 | |
| JP | 4406185 B2 | 1/2010 | |
| JP | 2011-126691 A | 6/2011 | |
| JP | 4756478 B2 | 8/2011 | |
| JP | 4909857 B2 | 4/2012 | |
| JP | 5017911 B2 | 9/2012 | |
| JP | 2012-239252 A | 12/2012 | |
| JP | 2013-051799 A | 3/2013 | |
| WO | 2012/032589 A1 | 3/2012 | |
| WO | 2015/194013 A1 | 12/2015 | |

* cited by examiner

AC MOTOR DRIVE SYSTEM

CROSS REFERENCE TO RELATED APPLICATIONS

This application is a National Stage of International Application No. PCT/JP2013/076873 filed Oct. 2, 2013, the contents of all of which are incorporated herein by reference in their entirety.

FIELD

The present invention relates to an AC motor drive system.

BACKGROUND

As a configuration example of AC motor drive systems, there has been an AC motor drive system in which an inverter that converts DC power into AC power having a voltage value and a frequency different from those of a system power supply to drive an AC motor and a charging/discharging circuit for charging and discharging a power storage device, which stores and discharges the DC power, are connected in parallel, via a smoothing capacitor, to a DC bus on the output side of a converter that converts AC power from the system power supply into DC power.

As an example of such an AC motor drive system, for example, Patent Literature 1 discloses a technology for an AC motor drive system that uses, when regenerative power regenerated from an AC motor via an inverter charges a power storage device via a charging/discharging circuit, a predetermined regeneration-time-current-command-value-integral-component initial value for proportional integral control (PI control) of a charging-current-command-value generating unit in the charging/discharging circuit to cope with regenerative power having a steep regeneration initial value.

CITATION LIST

Patent Literature

Patent Literature 1: Japanese Patent Application Laid-Open No. 2012-239252

SUMMARY

Technical Problem

However, according to the conventional technology, the regeneration-time-current-command-value-integral-component initial value is set to a value close to the allowable current value of the reactor in the charging/discharging circuit. Therefore, charging to the power storage device is started using, as an initial value of the charging current command value at regeneration start time, a charging current of a maximum amount of the AC motor drive system irrespective of the magnitude (the quantity) of the regenerative power. Therefore, when the actual regenerative power is smaller than the maximum regenerative power scheduled by the AC motor drive system, to supplement the regenerative power from the AC motor, the power storage device is charged also by using electric power supplied from the system power supply via the converter. Therefore, there is a problem in that, even during a regenerative operation, the converter performs an operation at the power running time and consumes electric power.

Moreover, according to the conventional technology, every time electric power on the output side of the converter exceeds a predetermined regeneration-time-power compensation threshold, the regeneration-time-current-command-value-integral-component initial value is set in the PI control unit of the charging-current-command-value generating unit. Therefore, there is a problem in that the charging current command value becomes discontinuous and the electric current flowing in the power storage device and the reactor of the charging/discharging circuit greatly changes, thereby reducing the life of the power storage device and the elements of the charging/discharging circuit.

The present invention has been devised in view of the above and it is an object of the present invention to obtain an AC motor drive system capable of generating a charging current command value for a power storage device that copes with steep regenerative power generation and that is in accordance with the magnitude of regenerative power.

Solution to Problem

In order to solve the above problems and achieve the object, as aspect of the present invention is an AC motor drive system including: a converter that supplies DC power; an inverter that converts the DC power into AC power; a DC bus that connects the converter and the inverter; an AC motor driven by the AC power; a DC-voltage-value detecting unit that detects a DC voltage value on an output side of the converter; a power storage device that is charged with the DC power from the DC bus and discharges the charged DC power to the DC bus; a charging/discharging circuit connected to the DC bus in parallel with the inverter and connected between the DC bus and the power storage device, the charging/discharging circuit causing the power storage device to be charged and discharge; a charging/discharging-current-value detecting unit that detects a charging/discharging current value of the power storage device; and a charging/discharging control unit that outputs a control signal for controlling the inverter on a basis of the DC voltage value and the charging/discharging current value, wherein when regenerative power from the AC motor via the inverter exceeds a predetermined power threshold, the charging/discharging control unit causes the power storage device to be charged such that the DC voltage value becomes a voltage threshold corresponding to the power threshold and causes a charging current at a start time of charging to the power storage device to start from a charging current value that is based on a DC bus voltage value of the DC bus.

Advantageous Effects of Invention

The AC motor drive system according to the present invention has an effect in that it is possible to obtain an AC motor drive system capable of generating a charging current command value for a power storage device that copes with steep regenerative power generation and that is in accordance with the magnitude of regenerative power.

DESCRIPTION OF EMBODIMENTS

Embodiments of an AC motor drive system according to the present invention are explained in detail below with reference to the drawings. Note that the present invention is not limited by the embodiments.

Note that, in this specification, units of physical quantities are clearly described. However, the physical quantities are not limited to the units. An operator |A| represents an absolute value (a positive number) of A.

First Embodiment

Figure 1:
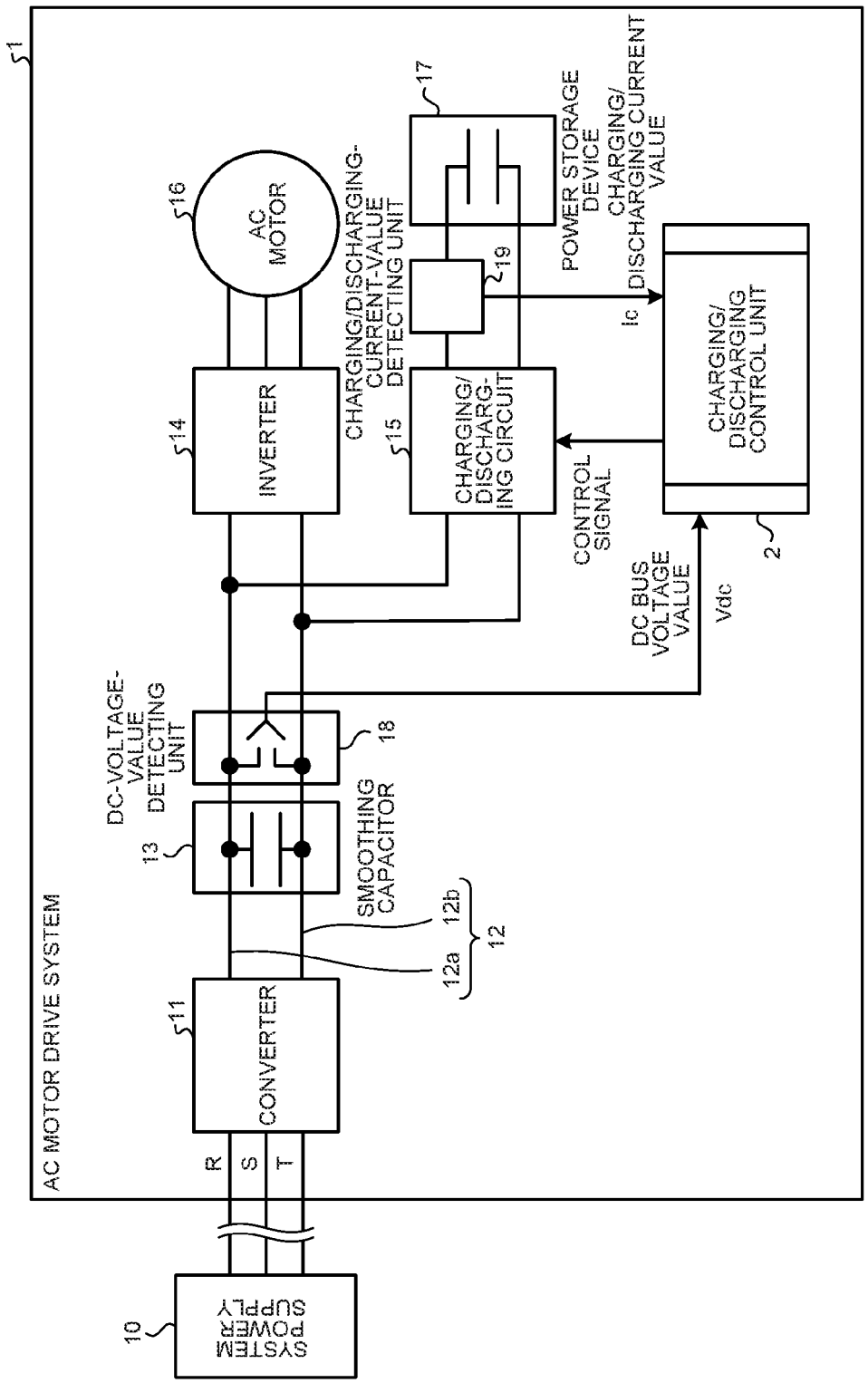
FIG. 1 is a block diagram illustrating an entire AC motor drive system according to a first embodiment.

FIG. 1 is a block diagram illustrating an entire first embodiment of the AC motor drive system according to the present invention.

An AC motor drive system 1 illustrated in FIG. 1 includes a charging/discharging control unit 2, a converter 11, a smoothing capacitor 13, an inverter 14, a charging/discharging circuit 15, an AC motor 16, a power storage device 17, a DC-voltage-value detecting unit 18, and a charging/discharging-current-value detecting unit 19.

AC power is supplied to the AC motor drive system 1 illustrated in FIG. 1 from a system power supply 10 such as a transformer substation or a transformer facility in a factory via wires R, S, and T.

The converter 11 converts AC power from the system power supply 10 into DC power. The converted DC power is output to a DC bus 12 from the converter 11. Note that the DC bus 12 includes a high-potential-side DC bus 12$a$ and a low-potential-side DC bus 12$b$.

The smoothing capacitor 13 is disposed in one or a plurality of places among the output portion of the converter 11, a portion on the DC bus 12, the input portion of the inverter 14 explained below, and a portion on the DC bus 12 side of the charging/discharging circuit 15 explained below. The smoothing capacitor 13 smoothes DC power between the high-potential-side DC bus 12$a$ and the low-potential-side DC bus 12$b$. The capacitance of the smoothing capacitor 13 is represented as C [F].

The DC power smoothed by the smoothing capacitor 13 is output to the inverter 14 and the charging/discharging circuit 15 via the DC bus 12. The inverter 14 and the charging/discharging circuit 15 are connected to the DC bus 12 in parallel.

The inverter 14 converts DC power into AC power and drives the AC motor 16. The voltage value and the frequency of the AC power output from the inverter 14 are different from the voltage value and the frequency of the AC power supplied from the system power supply 10.

The charging/discharging circuit 15 is a circuit that stores DC power flowing in the DC bus 12 in the power storage device 17 and discharges electric power stored in the power storage device 17 to the DC bus 12. As the charging/discharging circuit 15, a current reversible chopper circuit can be exemplified. When the charging/discharging circuit 15 is the current reversible chopper circuit, electric power flowing in the DC bus 12 is stored as a charging current to the power storage device 17. Conversely, the electric power stored in the power storage device 17 is discharged as a discharging current to the DC bus 12. Note that, in the following explanation, when an electric current flowing to the power storage device 17 is represented without distinguishing between the charging current and the discharging current, the electric current is described as charging/discharging current.

In the charging/discharging circuit 15, the current reversible chopper circuit is controlled by a control signal from the charging/discharging control unit 2 and the charging/discharging circuit 15 controls the amount of charging/discharging current. A DC bus voltage value Vdc of the DC bus 12 detected by the DC-voltage-value detecting unit 18 and a charging/discharging current value Ic detected by the charging/discharging-current-value detecting unit 19 are input to the charging/discharging control unit 2 as observation values. The charging/discharging control unit 2 outputs a control signal to the charging/discharging circuit 15.

As the converter 11, a resistance regeneration-type converter in which a resistance regeneration circuit is added to a three-phase full-wave rectifier circuit or a power supply regeneration-type converter in which switching elements are respectively connected in anti-parallel with diodes from which a three-phase full-wave rectifier circuit is configured and an AC reactor is inserted in series on the input side can be exemplified.

First, an explanation will be given of a case when the converter 11 is the resistance regeneration-type converter. In the resistance regeneration-type converter, when the AC motor 16 decelerates or stops and regenerative power is generated, the regenerative power is stored in the smoothing capacitor 13 via the inverter 14 and increases the voltage value of the DC bus 12. When the voltage value of the DC bus 12 increases to a voltage higher than a predetermined short-circuit start voltage value, the resistance regeneration circuit short-circuits the high-potential-side DC bus 12a and the low-potential-side DC bus 12b via the resistor in the resistance regeneration-type converter and converts the energy stored in the smoothing capacitor 13 into heat in the resistor. Thereafter, electric charges stored in the smoothing capacitor 13 as a result of the short circuit are discharged. Therefore, when the voltage value of the DC bus 12 decreases to a voltage lower than a predetermined short-circuit end voltage value, the high-potential-side DC bus 12a and the low-potential-side DC bus 12b short-circuited by the resistance regeneration circuit are disconnected. When the converter 11 is the resistance regeneration-type converter, the converter 11 repeats such an operation to consume the regenerative power.

Next, an explanation will be given of a case when the converter 11 is the power supply regeneration-type converter. In the power supply regeneration-type converter, when the voltage value of the DC bus 12 increases to a voltage higher than a predetermined regeneration start voltage value due to the regenerative power, the switching elements in the power supply regeneration-type converter become a conduction state for a predetermined period by a control circuit in the power supply regeneration-type converter according to the phase of the waveform of the system power supply 10. Electric charges stored in the smoothing capacitor 13 are regenerated to the system power supply 10 via the AC reactor in the power supply regeneration-type converter. The regenerative operation to the system power supply 10 is continued until the voltage value of the DC bus 12 decreases to a voltage lower than the predetermined regeneration end voltage value. The regenerative power generated by the AC motor 16 is regenerated to the system power supply 10 by the regenerative operation.

Figure 2:
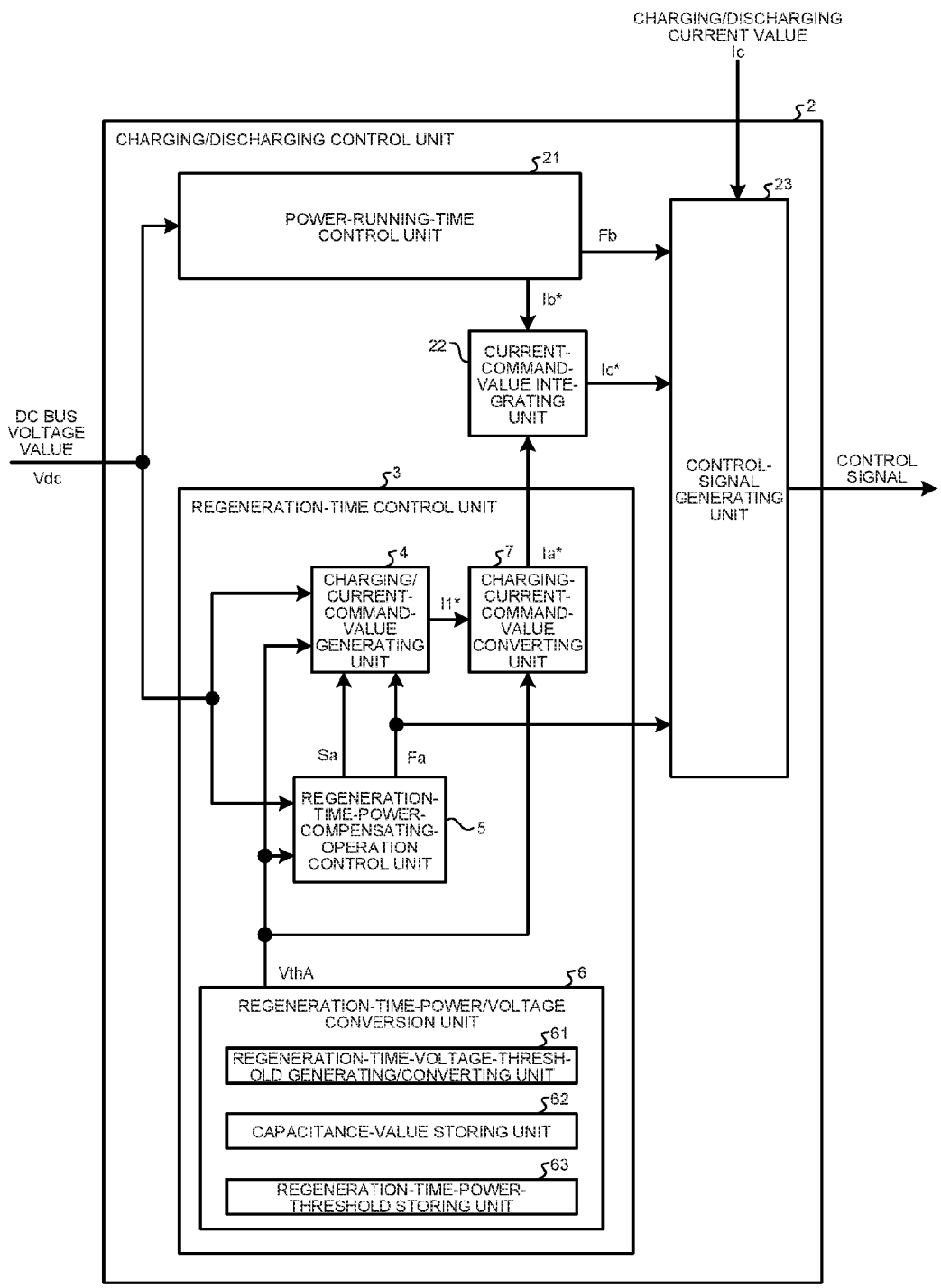
FIG. 2 is a block diagram illustrating a charging/discharging control unit in the AC motor drive system according to the first embodiment.

FIG. 2 is a block diagram illustrating the charging/discharging control unit 2 in the AC motor drive system 1. The charging/discharging control unit 2 illustrated in FIG. 2 includes a power-running-time control unit 21, a regeneration-time control unit 3, a current-command-value integrating unit 22, and a control-signal generating unit 23.

The power-running-time control unit 21 receives, as an input, the DC bus voltage value Vdc (detected by the DC-voltage-value detecting unit 18) of the DC bus 12, the voltage of which has dropped due to the power running operation of the AC motor 16, and outputs a power-storage-device-side discharging current command value Ib*, which is a command value for controlling a discharging current for discharging from the power storage device 17, and a power-running-time-power compensating operation flag Fb for determining a period during which the power storage device 17 is caused to discharge.

The regeneration-time control unit 3 receives, as an input, the DC bus voltage value Vdc (detected by the DC-voltage-value detecting unit 18) of the DC bus 12, the voltage of which has risen due to the regenerative operation of the AC motor 16 and outputs a power-storage-device-side charging current command value Ia*, which is a command value for controlling a charging current for charging the power storage device 17, and a regeneration-time-power compensating operation flag Fa for determining a period during which the power storage device 17 is charged.

The current-command-value integrating unit 22 generates an integrated charging/discharging current command value Ic*, which is a command value of a charging/discharging current of the power storage device 17, by using the power-storage-device-side charging current command value Ia* and the power-storage-device-side discharging current command value Ib*.

The control-signal generating unit 23 reduces the difference between the integrated charging/discharging current command value Ic* and the charging/discharging current value Ic to be finally eliminated by using the integrated charging/discharging current command value Ic* from the current-command-value integrating unit 22 and the charging/discharging current value Ic of the power storage device 17 from the charging/discharging-current-value detecting unit 19. The control-signal generating unit 23 generates a control signal for controlling the charging/discharging circuit 15 in a period of the power-running-time-power compensating operation flag Fb from the power-running-time control unit 21 or the regeneration-time-power compensating operation flag Fa from the regeneration-time control unit 3.

FIGS. 3(a) to 3(c) are diagrams illustrating temporal changes of the electric power P, the DC bus voltage value Vdc, and the regeneration-time-power compensating operation flag Fa. In FIG. 3(a), a temporal change of regenerative power Pload(t) regenerated from the AC motor 16 via the inverter 14 is indicated by a thick line. One of the functions of the AC motor drive system 1 illustrated in FIG. 1 is to charge, with respect to the regenerative power Pload(t), the power storage device 17 with electric power indicated on the vertical axis in a portion indicated by a lattice pattern in FIG. 3(a), i.e., charging power |Pc(t)|, to thereby suppress electric power regenerated in the converter 11 such that it does not exceed a power threshold PthA illustrated in FIG. 3(a) so as to limit the peak of the electric power converted into heat and consumed by the converter 11 or the electric power regenerated to the system power supply 10.

The regenerative power Pload(t) indicated by the thick line in FIG. 3(a) is a schematic example of a waveform generated when the AC motor 16 stops or performs a quick deceleration operation. In FIG. 3(a), power running power of the AC motor 16 is represented by a positive number and regenerative power is represented by a negative number. Charging power and a charging current to the power storage device 17 are represented by positive numbers and discharging power and a discharging current are represented by negative numbers.

Electric power Pcnv(t) in a portion indicated by hatching in FIG. 3(a) is defined by the following Formula (1).

$$Pcnv(t)=Pload(t)-Pc(t) \qquad (1)$$

The electric power Pcnv(t) represents electric power on the DC bus 12 side of the converter 11. When the electric power Pcnv(t) is a positive number value, this indicates that the converter 11 converts electric power and outputs the electric power from the system power supply 10 to the DC bus 12 by a power value |Pcnv(t)|. Conversely, when the electric power Pcnv(t) is a negative number value, this indicates that the converter 11 converts electric power into heat and consumes the electric power from the DC bus 12 by the power value |Pcnv(t)| or regenerates the electric power to the system power supply 10.

When the electric power Pcnv(t) is a negative value and the converter 11 is the resistance regeneration-type converter, as explained above, while the DC bus voltage value Vdc(t) of the DC bus 12 fluctuates between the short-circuit start voltage value and the short-circuit end voltage value, the electric power Pcnv(t) is consumed in the resistor in the converter 11.

When the electric power Pcnv(t) is a negative value and the converter 11 is the power supply regeneration-type converter, as explained above, while the DC bus voltage value Vdc(t) of the DC bus 12 fluctuates between the regeneration start voltage value and the regeneration end voltage value, the electric power Pcnv(t) is regenerated to the system power supply 10 via the AC reactor in the converter 11.

Figure 4:
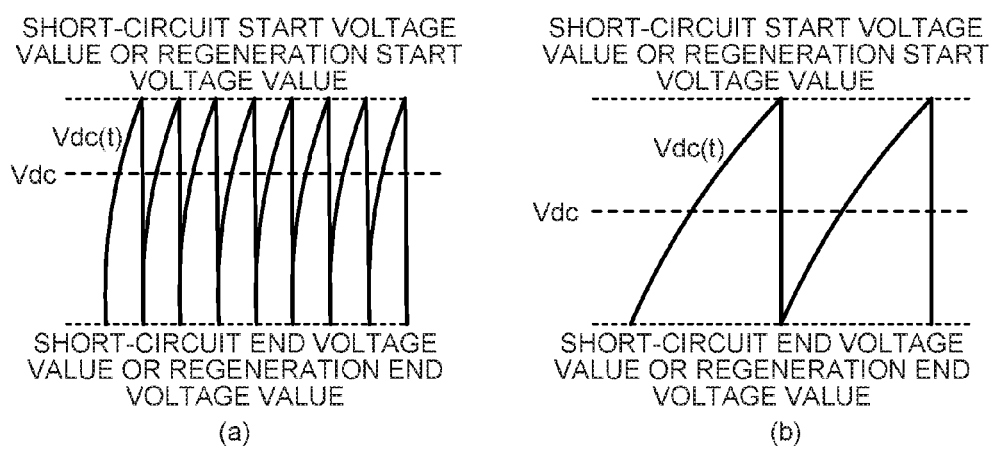
FIG. 4 is a diagram schematically illustrating a waveform of a DC bus voltage value Vdc(t) of a DC bus when electric power Pcnv(t) is a negative value in the AC motor drive system according to the first embodiment.

FIG. 4 is a diagram schematically illustrating a waveform of the DC bus voltage value Vdc(t) of the DC bus 12 when the electric power Pcnv(t) is a negative value. FIG. 4(a) illustrates a waveform when the power value |Pcnv(t)| is relatively large. FIG. 4(b) illustrates a waveform when the power value |Pcnv(t)| is relatively small. In FIG. 4(a) and FIG. 4(b), a DC bus voltage value Vdc indicated by a thick broken line is a time average value of the DC bus voltage value Vdc(t). For example, the DC bus voltage value Vdc can be obtained by causing the DC bus voltage value Vdc(t) to pass through a low pass filter (LPF). The DC-voltage-value detecting unit 18 detects the DC bus voltage value Vdc(t).

When FIG. 4(a) and FIG. 4(b) are compared, the DC bus voltage value Vdc, which is the time average value, is high when the power value |Pcnv(t)| is relatively large. The DC bus voltage value Vdc, which is the time average value, is low when the power value |Pcnv(t)| is relatively small. The waveform of the DC bus voltage value Vdc(t) is formed by charging of the electric power Pcnv(t) to the smoothing capacitor 13 and discharging from the smoothing capacitor 13 to the converter 11. Therefore, the DC bus voltage value Vdc depends on not only the power value |Pcnv(t)| but also the capacitance value C of the smoothing capacitor 13.

A transfer function of the low pass filter is combined with a transfer function of a charging-current-command-value generating unit 4 explained below. Therefore, in characteristics after the combination, attention should be paid to the stability of the AC motor drive system 1. In general, as the transfer function of the low pass filter, a lower-order characteristic is preferable to ensure a degree of freedom of the transfer function of the charging-current-command-value generating unit 4. If a desired DC bus voltage value Vdc can be obtained by a primary low pass filter, it is preferable to adopt the primary low pass filter.

Note that, in FIG. 4(a) and FIG. 4(b), the DC bus voltage value Vdc(t) falls within a range between the short-circuit start voltage value (or the regeneration start voltage value) and the short-circuit end voltage value (or the regeneration end voltage value). However, it is noted that, in the actual operation, the DC bus voltage value Vdc(t) is sometimes outside the range according to the limitation on the operation speed and the temporal relation with the phase of the system power supply 10.

Figure 3:
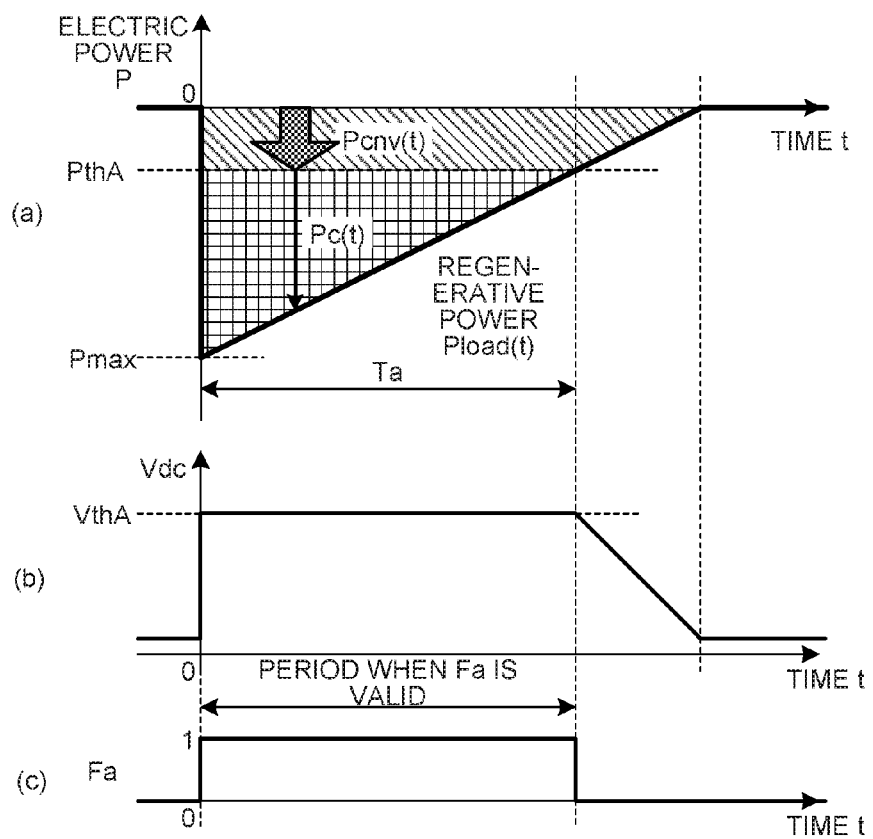
FIG. 3 is a diagram illustrating temporal changes of electric power P, a DC bus voltage value Vdc, and a regeneration-time-power compensating operation flag Fa in the AC motor drive system according to the first embodiment.

FIG. 3 referred to above and FIG. 10 referred to below illustrate that the DC bus voltage value Vdc during the regenerative operation increases such that it becomes larger than the DC bus voltage value before the regenerative operation. However, as it is evident from the above explanation, the DC bus voltage value Vdc during the regenerative operation is determined on the basis of the correlation between the short-circuit start voltage value (or the regeneration start voltage value) and the short-circuit end voltage value (or the regeneration end voltage value). That is, when the short-circuit start voltage value (or the regeneration start voltage value) is slightly higher than the DC bus voltage value before the regenerative operation and, on the other hand, the short-circuit end voltage value (or the regeneration end voltage value) is substantially lower than the DC bus voltage value before the regenerative operation, the DC bus voltage value Vd during the regenerative operation decreases such that it becomes smaller than the DC bus voltage value before the regenerative operation.

Figure 5:
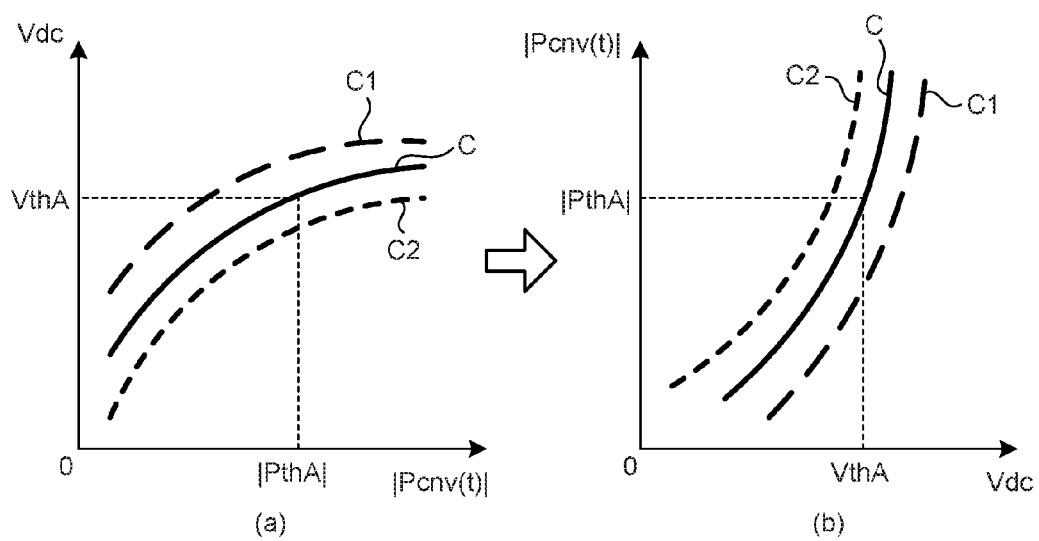
FIG. 5 is a diagram illustrating a relation between a power value |Pcnv(t)| and the DC bus voltage value Vdc in the AC motor drive system according to the first embodiment.

FIG. 5 is a diagram illustrating a relation between the power value |Pcnv(t)| and the DC bus voltage value Vdc. As explained above, the relation between the power value |Pcnv(t)| and the DC bus voltage value Vdc when the capacitance value of the smoothing capacitor 13 is C is indicated by a thick solid line illustrated in FIG. 5(a). Similarly, the relations when the capacitance value of the smoothing capacitor 13 is C1 and C2 are indicated by broken lines illustrated in FIG. 5(a).

In general, in FIG. 5(a), the relation of C1<C<C2 holds. However, in some case, the difference between the capacitance values C1 and C2 is not very large or the relation between the power value |Pcnv(t)| and the DC bus voltage value Vdc is represented by one kind of the capacitance value C according to the resolution of the DC-voltage-value detecting unit 18 and the characteristic of an LPF in use without taking into account the difference between the capacitance values of the smoothing capacitor 13.

As illustrated in FIG. 5(a), when the capacitance value of the smoothing capacitor 13 is C, if it is attempted to suppress electric power to the converter 11 in the regenerative power from the AC motor 16 such that it is equal to or less than a power threshold |PthA|, the voltage value of the DC bus 12 should be set to be equal to or less than a voltage threshold VthA. In FIG. 3(a) and FIG. 3(b), temporal changes of the waveforms of the regenerative power Pload(t) from the AC motor 16, the electric power Pcnv(t) to the converter 11, and the DC bus voltage value Vdc of the DC bus 12 in this regenerative operation is illustrated.

In a period during which electric power to the converter 11 is suppressed such that it is the power threshold PthA, i.e., a period during which the power storage device 17 is charged with charging power Pc(t) illustrated in FIG. 3(a) (a period indicated by Ta in FIG. 3(a)), the DC bus voltage value Vdc of the DC bus 12 is the voltage threshold VthA (see FIG. 3(b)). FIG. 5(b) is a diagram in which the horizontal axis and the vertical axis of FIG. 5(a) are interchanged. As it is seen from FIG. 5(b) as well, by charging the power storage device 17 with electric power such that the DC bus voltage value Vdc of the DC bus 12 is kept at the voltage threshold VthA or less, it is possible to suppress the power value |Pcnv(t)| to the converter 11 such that it is equal to or less than the power threshold |PthA|.

The regeneration-time control unit 3 illustrated in FIG. 2 generates, from the DC bus voltage value Vdc of the DC bus 12 and the voltage threshold (a voltage command value) VthA during the regeneration, the power-storage-device-side charging current command value Ia* corresponding to the charging power Pc(t). The DC bus voltage value Vdc of the DC bus 12 input to the regeneration-time control unit 3 from the DC-voltage-value detecting unit 18 is input to the charging-current-command-value generating unit 4 and a regeneration-time-power-compensating-operation control unit 5 in the regeneration-time control unit 3.

On the other hand, a regeneration-time-power/voltage conversion unit 6 includes a regeneration-time-voltage-threshold generating/converting unit 61, a capacitance-value storing unit 62, and a regeneration-time-power-threshold storing unit 63.

The regeneration-time-power-threshold storing unit 63 stores the power threshold PthA during regeneration, which is an upper limit value of electric power to be regenerated to the converter 11.

The capacitance-value storing unit 62 stores the capacitance value C of the smoothing capacitor 13.

The regeneration-time-voltage-threshold generating/converting unit 61 generates the voltage threshold VthA during regeneration on the basis of the correspondence relation illustrated in FIG. 5(a) according to the power threshold PthA during regeneration from the regeneration-time-power-threshold storing unit 63 and the capacitance C from the capacitance-value storing unit 62. The regeneration-time-voltage-threshold generating/converting unit 61 generates the voltage threshold VthA during regeneration by realizing the correspondence relation illustrated in FIG. 5(a), for example, through reading of a lookup table (LUT) or calculation by using an approximation formula and outputs the voltage threshold VthA. The voltage threshold VthA during regeneration, which is the output of the regeneration-time-power/voltage conversion unit 6, i.e., the output of the regeneration-time-voltage-threshold generating/converting unit 61, is output to the charging-current-command-value generating unit 4, the regeneration-time-power-compensating-operation control unit 5, and a charging-current-command-value converting unit 7.

Note that the power threshold PthA during regeneration and the capacitance value C only have to be set as appropriate according to the work load of the AC motor drive system 1 and the configuration of the inverter. The configuration only has to be such that the power threshold PthA and the capacitance value C can be input by the user to the regeneration-time-power-threshold storing unit 63 and the capacitance-value storing unit 62, respectively.

The regeneration-time-power-compensating-operation control unit 5 generates, on the basis of the DC bus voltage value Vdc from the DC-voltage-value detecting unit 18, a regeneration-time-power-compensating-operation start signal Sa indicating timing when charging to the power storage device 17 is started. The regeneration-time-power-compensating-operation control unit 5 generates, by using the DC bus voltage value Vdc and the voltage threshold VthA during regeneration, the regeneration-time-power compensating operation flag Fa indicating a period during which the power storage device 17 is charged.

The regeneration-time-power-compensating-operation start signal Sa generated by the regeneration-time-power-compensating-operation control unit 5 is output to the charging-current-command-value generating unit 4. The regeneration-time-power compensating operation flag Fa is output to the charging-current-command-value generating unit 4 and the control-signal generating unit 23. The regeneration-time-power-compensating-operation start signal Sa is, for example, a signal indicating time when the DC bus voltage value Vdc reaches the voltage threshold VthA during regeneration or is a signal indicating time when the DC bus voltage value Vdc becomes equal to or larger than a DC-bus voltage value during no load (when the AC motor 16 is carrying out neither a power running operation nor a regenerative operation). The regeneration-time-power compensating operation flag Fa is, for example, a signal indicating time from the time indicated by the regeneration-time-power-compensating-operation start signal Sa to time when the DC bus voltage value Vdc becomes equal to or smaller than the voltage threshold VthA during regeneration.

FIG. 3C is a diagram illustrating a relation between regenerative power of the regeneration-time-power compensating operation flag Fa and the DC bus voltage value Vdc.

Note that, to simplify the following explanation, setting is performed as explained below. The regeneration-time-power-compensating-operation start signal Sa is a binary logic signal that takes, when it is valid, a value of 1 at timing when charging to the power storage device 17 is started and takes, in the other periods, a value of 0. The regeneration-time-power compensating operation flag Fa is a binary logic signal that takes, when it is valid, a value of 1 in a period during which the power storage device 17 is charged and takes, in the other periods, a value of 0. Note that, concerning a condition under which the regeneration-time-power-compensating-operation start signal Sa becomes valid and a start condition and an end condition under which the regeneration-time-power compensating operation flag Fa becomes valid, chattering prevention, setting of a dead zone, or the like is sometimes performed to eliminate the influence of fluctuation of noise superimposed on the DC-bus voltage value Vdc.

Figure 6:
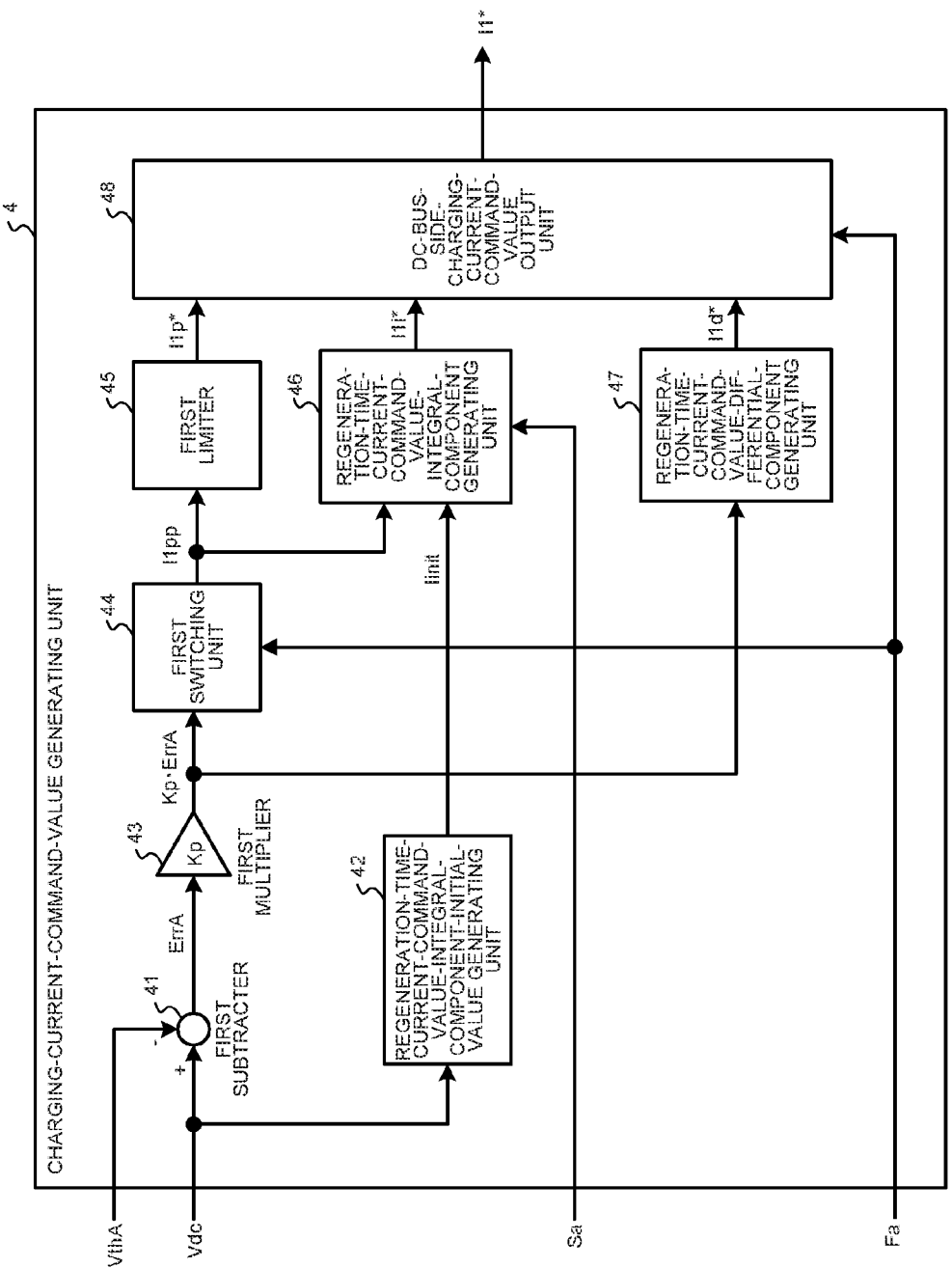
FIG. 6 is a block diagram illustrating a charging-current-command-value generating unit in a regeneration-time control unit in the AC motor drive system according to the first embodiment.

FIG. 6 is a block diagram illustrating the charging-current-command-value generating unit 4 in the regeneration-time control unit 3. The charging-current-command-value generating unit 4 illustrated in FIG. 6 includes a first subtractor 41, a regeneration-time-current-command-value-integral-component-initial-value generating unit 42, a first multiplier 43, a first switching unit 44, a first limiter 45, a regeneration-time-current-command-value-integral-component generating unit 46, a regeneration-time-current-command-value-differential-component generating unit 47, and a DC-bus-side-charging-current-command-value output unit 48.

The DC bus voltage value Vdc of the DC bus 12 detected by the DC-voltage-value detecting unit 18 is input to the minuend terminal of the first subtractor 41 and the regeneration-time-current-command-value-integral-component-initial-value generating unit 42.

The first subtractor 41 outputs a value obtained by subtracting the voltage threshold VthA during regeneration generated by the regeneration-time-power/voltage conversion unit 6 from the DC bus voltage value Vdc, i.e., a regeneration-time voltage differential value ErrA indicated by the following Formula (2) to the first multiplier 43.

$$ErrA = Vdc - VthA \qquad (2)$$

The first multiplier 43 generates a multiplication value Kp·ErrA obtained by multiplying the regeneration-time voltage differential value ErrA input from the first subtractor 41 by a predetermined constant Kp, which is a proportional gain, and outputs the multiplication value Kp·ErrA to the first switching unit 44 and the regeneration-time-current-command-value-differential-component generating unit 47.

The first switching unit 44 generates an output value $I1_{pp}$ defined by the following Formula (3) by using the regeneration-time-power compensating operation flag Fa, which is the output of the regeneration-time-power-compensating-operation control unit 5, and outputs the output value I1$pp$.

$$I1pp = Kp \cdot ErrA \cdot Fa \quad (3)$$

The first switching unit 44 outputs the multiplication value Kp·ErrA in the period during which the regeneration-time-power compensating operation flag Fa indicates valid and outputs a value of 0 in the other periods. The output value I1$pp$ of the first switching unit 44 is output to the first limiter 45 and the regeneration-time-current-command-value-integral-component generating unit 46.

The first limiter 45 outputs a regeneration-time-current-command-value proportional component value I1$p$*. The regeneration-time-current-command-value proportional component value I1$p$* is 0 when the input output value I1$pp$ is a negative value, is a current limit value Imax when the input output value I1$pp$ exceeds the current limit value Imax in the AC motor drive system 1, and is a value the same as the input value when the input output value I1$pp$ is a positive value and is the current limit value Imax or less. Note that the current limit value Imax in the AC motor drive system 1 is, for example, a maximum of a charging current of the charging/discharging circuit 15, a maximum of a charging current of the power storage device 17, or a value close to these maximums. The regeneration-time-current-command-value proportional component value I1$p$* output from the first limiter 45 can be represented by the following Formula (4).

$$I1p^* \begin{cases} 0 \text{ (in the case of } I1pp < 0) \\ I1pp \text{ (in the case of } 0 \leq I1pp \leq Imax) \\ Imax \text{ (in the case of } I1pp > Imax) \end{cases} \quad (4)$$

The regeneration-time-current-command-value proportional component value I1$p$* is input to the DC-bus-side-charging-current-command-value output unit 48.

Figure 7:
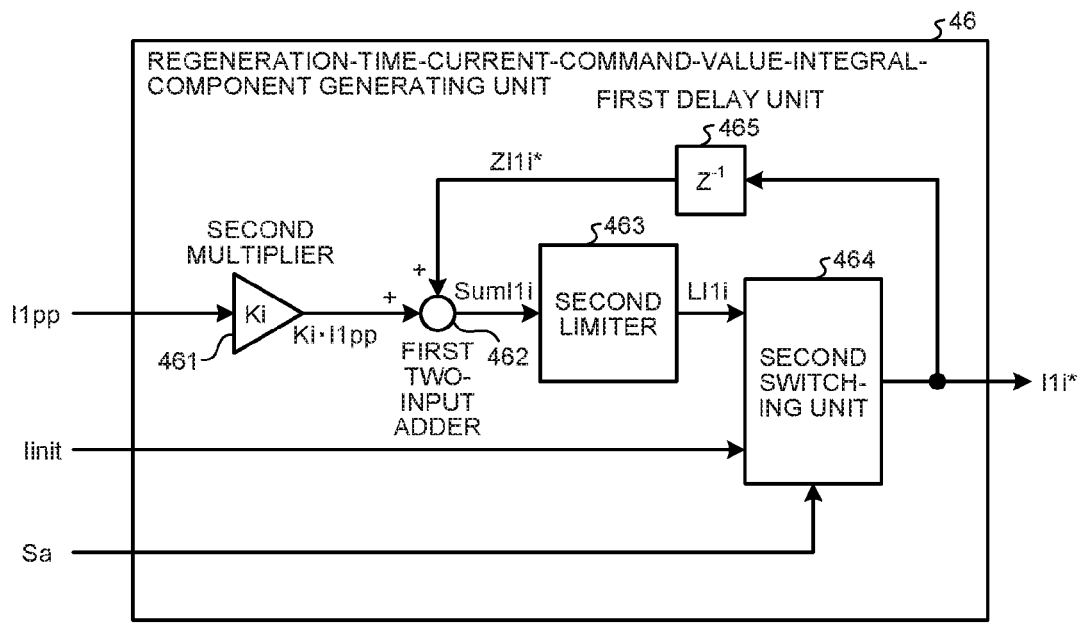
FIG. 7 is a block diagram illustrating a regeneration-time-current-command-value-integral-component generating unit in the charging-current-command-value generating unit in the AC motor drive system according to the first embodiment.

FIG. 7 is a block diagram illustrating the regeneration-time-current-command-value-integral-component generating unit 46 in the charging-current-command-value generating unit 4. The regeneration-time-current-command-value-integral-component generating unit 46 illustrated in FIG. 7 includes a second multiplier 461, a first two-input adder 462, a second limiter 463, a second switching unit 464, and a first delay unit 465.

The output value I1$pp$ of the first switching unit 44, a regeneration-time-current-command-value integral component initial value Iinit, which is an output value of the regeneration-time-current-command-value-integral-component-initial-value generating unit 42, and the regeneration-time-power-compensating-operation start signal Sa are input to the regeneration-time-current-command-value-integral-component generating unit 46.

The second multiplier 461 generates a multiplication value Ki·I1$pp$ obtained by multiplying the output value I1$pp$ by a predetermined constant Ki, which is an integral gain, and outputs the multiplication value Ki·I1$pp$ to one input end of the first two-input adder 462.

The first two-input adder 462 calculates the sum of the multiplication value Ki·I1$pp$, which is the output of the second multiplier 461, and an output value ZI1$i$* of the first delay unit 465 and outputs an addition value SumI1$i$. Processing by the first two-input adder 462 can be represented by the following Formula (5).

$$SumI1i = Ki \cdot I1pp + ZI1i^* \quad (5)$$

The second limiter 463 outputs an output value LI1$i$. The output value LI1$i$ is 0 when the input addition value SumI1$i$ is a negative value, is the current limit value Imax when the input addition value SumI1$i$ exceeds the current limit value Imax in the AC motor drive system 1, and is a value the same as the input value when the input addition value SumI1$i$ is a positive value and is the current limit value Imax or less.

The output value LI1$i$ output from the second limiter 463 can be represented by the following Formula (6).

$$LI1i \begin{cases} 0 \text{ (in the case of } SumI1i < 0) \\ SumI1i \text{ (in the case of } 0 \leq SumI1i \leq Imax) \\ Imax \text{ (in the case of } SumI1i > Imax) \end{cases} \quad (6)$$

The second switching unit 464 outputs, in response to the inputs of the output value LI1$i$ output from the second limiter 463 and the regeneration-time-current-command-value integral component initial value Iinit output from the regeneration-time-current-command-value-integral-component-initial-value generating unit 42, a selection result I1$i$*, which is a value obtained by carrying out selection indicated by the following Formula (7), by using the regeneration-time-power-compensating-operation start signal Sa, which is the output of the regeneration-time-power-compensating-operation control unit 5.

$$I1i^* \begin{cases} LI1i \text{ (in the case of } Sa = 0) \\ Iinit \text{ (in the case of } Sa = 1) \end{cases} \quad (7)$$

The selection result I1$i$* is output to the first delay unit 465 and the DC-bus-side-charging-current-command-value output unit 48.

The first delay unit 465 delays the input value by one unit of a control time interval and outputs the input value. The result obtained by delaying the selection result I1$i$*, which is the output value of the second switching unit 464, by one unit of the control time interval by the first delay unit 465, is an output value ZI1$i$*. The processing represented by the above Formula (5) is executed by the first two-input adder 462, whereby an integral function for the multiplication value Ki·I1$pp$ output from the second multiplier 461 is realized. That is, the selection result I1$i$* output from the second switching unit 464 is a regeneration-time-current-command-value integral component value.

The regeneration-time-current-command-value-integral-component generating unit 46 illustrated in FIG. 7 includes the configuration explained above. Therefore, a regeneration-time-current-command-value integral component value I1$i$* retains a value of 0 before regeneration-time-power-compensating-operation start time by the first switching unit 44. An integral operation is started from the regeneration-time-current-command-value integral component initial value Iinit at the regeneration-time-power-compensating-operation start time by the second switching unit 464. The maximum of the regeneration-time-current-command-value integral component value I1$i$* is prevented from exceeding the current limit value Imax by the second limiter 463. Note that the constant Ki, which is the integral gain, is a value including a factor due to a control time interval.

Figure 8:
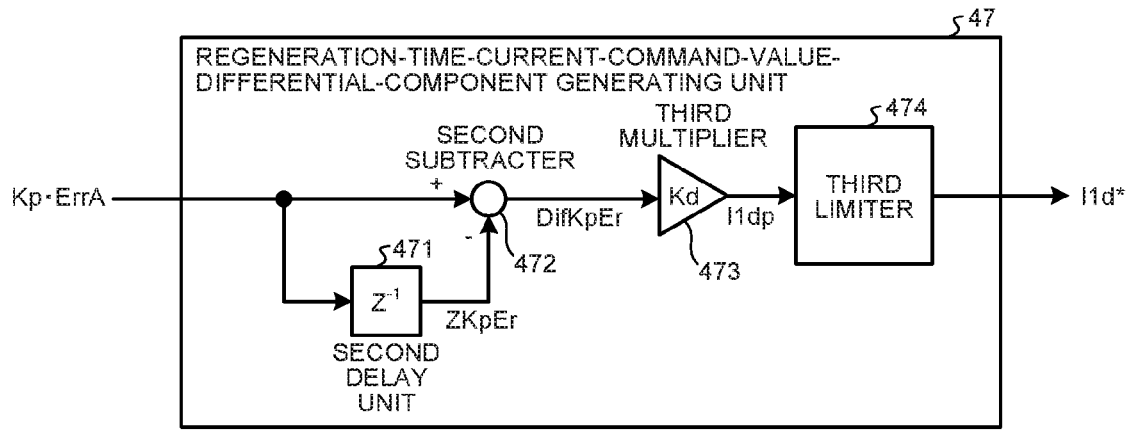
FIG. 8 is a block diagram illustrating a regeneration-time-current-command-value-differential-component generating unit in the charging-current-command-value generating unit in the AC motor drive system according to the first embodiment.

FIG. 8 is a block diagram illustrating the regeneration-time-current-command-value-differential-component generating unit 47 in the charging-current-command-value generating unit 4. The regeneration-time-current-commandvalue-differential-component generating unit 47 illustrated in FIG. 8 includes a second delay unit 471, a second subtractor 472, a third multiplier 473, and a third limiter 474. The multiplication value Kp·ErrA, which is output from the first multiplier 43 and is input to the regeneration-time-current-command-value-differential-component generating unit 47, is input to the second delay unit 471 and the minuend terminal of the second subtractor 472.

The second delay unit 471 delays the input by one unit of a control time interval and outputs the input. The result obtained by delaying the multiplication value Kp·ErrA, which is output from the first multiplier 43, by one unit of the control time interval by the second delay unit 471 is output as an output value ZKpEr. The output value ZKpEr of the second delay unit 471 is input to the subtrahend terminal of the second subtractor 472.

The second subtractor 472 outputs a subtraction value DifKpEr defined by the following Formula (8) to the third multiplier 473.

$$DifKpEr = Kp \cdot ErrA - ZKpEr \quad (8)$$

The third multiplier 473 generates a multiplication value I1$dp$ obtained by multiplying the subtraction value DifKpEr by a predetermined constant Kd, which is a differential gain, and outputs the multiplication value I1$dp$ to the third limiter 474.

The third limiter 474 performs processing represented by the following Formula (9) on the multiplication value I1$dp$ on the basis of the value 0 and the current limit value Imax and outputs the multiplication value I1$dp$ to the DC-bus-side-charging-current-command-value output unit 48.

$$I1d^* \begin{cases} 0 & \text{(in the case of } I1dp < 0) \\ I1pp & \text{(in the case of } 0 \le I1dp \le Imax) \\ Imax & \text{(in the case of } I1dp > Imax) \end{cases} \quad (9)$$

The processing represented by Formula (8) is carried out by the second subtractor 472, whereby a differential function for the multiplication value Kp·ErrA output from the first multiplier 43 is realized. Therefore, the output of the third limiter 474 becomes the regeneration-time-current-command-value differential component value I1$d^*$.

The regeneration-time-current-command-value-differential-component generating unit 47 includes the configuration explained above. Therefore, the maximum of the regeneration-time-current-command-value differential component value I1$d^*$ is prevented from exceeding the current limit value Imax by the third limiter 474. Note that the constant Kd, which is the differential gain, is a value including a factor due to a control time interval.

Figure 9:
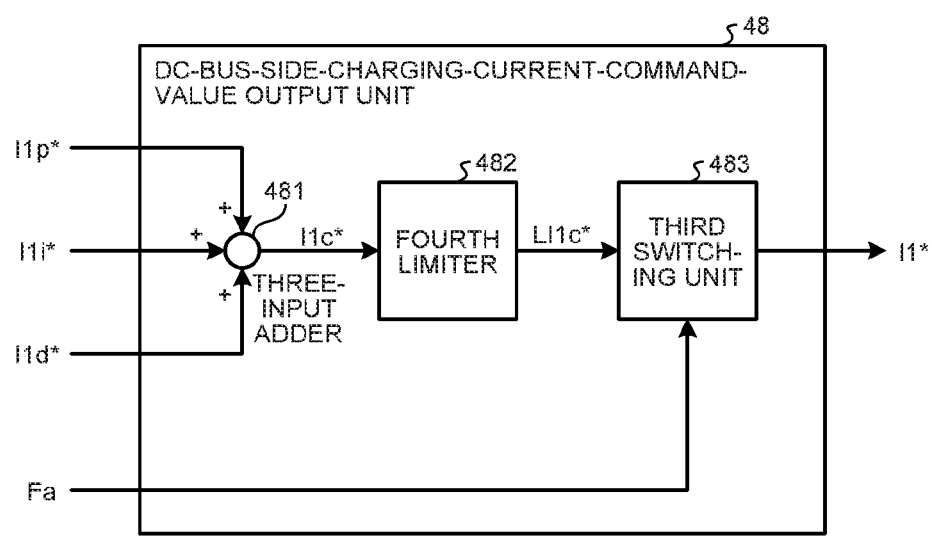
FIG. 9 is a block diagram illustrating a DC-bus-side-charging-current-command-value output unit in the AC motor drive system according to the first embodiment.

FIG. 9 is a block diagram illustrating the DC-bus-side-charging-current-command-value output unit 48. The DC-bus-side-charging-current-command-value output unit 48 illustrated in FIG. 9 includes a three-input adder 481, a fourth limiter 482, and a third switching unit 483.

The three-input adder 481 outputs, to the fourth limiter 482, a sum I1$c^*$ of the regeneration-time-current-command-value proportional component value I1$p^*$ output from the first limiter 45, the regeneration-time-current-command-value integral component value I1$i^*$ output from the regeneration-time-current-command-value-integral-component generating unit 46, and the regeneration-time-current-command-value differential component value I1$d^*$ output from the regeneration-time-current-command-value-differential-component generating unit 47.

The fourth limiter 482 outputs an output value LI1$c^*$. The output value LI1$c^*$ is 0 when the sum I1$c^*$ is a negative value, is the current limit value Imax when the sum I1$c^*$ exceeds the current limit value Imax in the AC motor drive system 1, and is a value the same as the input value when the sum I1$c^*$ is a positive value and is the current limit value Imax or less. The output value LI1$c^*$ output from the fourth limiter 482 can be represented by the following Formula (10).

$$LI1c^* \begin{cases} 0 & \text{(in the case of } I1c^* < 0) \\ I1c^* & \text{(in the case of } 0 \le I1c^* \le Imax) \\ Imax & \text{(in the case of } I1c^* > Imax) \end{cases} \quad (10)$$

The third switching unit 483 generates, by using the regeneration-time-power compensating operation flag Fa, a DC-bus-side-charging-current command value I1* defined by the following Formula (11) and outputs the DC-bus-side-charging-current command value I1*.

$$I1^* = LI1c^* \cdot Fa \quad (11)$$

The third switching unit 483 outputs the output value LI1$c^*$ as the DC-bus-side-charging-current command value I1* in a period during which the regeneration-time-power compensating operation flag Fa indicates valid and outputs 0 in the other periods. The DC-bus-side-charging-current command value I1* of the third switching unit 483 is output to the charging-current-command-value converting unit 7.

A charging current value Is to the power storage device 17 at the regenerative operation initial time can be represented by the following Formula (12-1) by using maximum regenerative power Pmax at the regenerative operation initial time illustrated in FIG. 3($a$).

$$Is \cdot VthA = |Pmax| - |PthA| \quad (12\text{-}1)$$

As explained above, the relation illustrated in FIG. 5($b$) is present between the DC bus voltage value Vdc of the DC bus 12 and the regenerative power. The relation when the capacitance value of the smoothing capacitor 13 is C, i.e., indicated by a thick solid line in FIG. 5($b$) is represented by a function fc(Vdc). When the DC bus voltage value assumed to be the maximum regeneration power Pmax in the function fc(Vdc) is defined as a maximum DC bus voltage value Vmax, the relation of the following Formula (12-2) holds.

$$|Pmax| = fc(Vmax) \quad (12\text{-}2)$$

Formula (12-1) can be transformed into the following Formula (12-3) according to the above Formula (12-2).

$$Is = (1/VthA)fc(Vmax) - |PthA|/VthA \quad (12\text{-}3)$$

In the formula, 1/VthA and −|PthA|/VthA are respectively constants, values of which are known in advance. Therefore, when these values are respectively defined by the following Formulas (12-4) and (12-5), the above Formula (12-3) can be represented by the following Formula (12-6).

$$a = 1/VthA \quad (12\text{-}4)$$

$$b = -|PthA|/VthA \quad (12\text{-}5)$$

$$Is = a \cdot fc(Vmax)) + b \quad (12\text{-}6)$$

However, in the AC motor drive system 1, a peak of the regenerative power is suppressed by a charging operation to the power storage device 17. Therefore, even if the DC bus voltage value Vdc, which is the output of the DC-voltage-value detecting unit 18, is observed, the value of the maximum DC bus voltage value Vmax cannot be obtained. Therefore, the maximum DC bus voltage value Vmax is estimated from the observable DC bus voltage value Vdc. Pmax1, Pmax2, Vmax1, and Vmax2, for which the relations of the following Formula (12-7) and Formula (12-8) hold from the above Formula (12-2), are respectively defined. However, it is assumed that Formula (12-9) holds between Pmax1 and Pmax2.

$$|Pmax1|=fc(Vmax1) \quad (12\text{-}7)$$

$$|Pmax2|=fc(Vmax1) \quad (12\text{-}8)$$

$$Pmax1>Pmax2 \quad (12\text{-}9)$$

Figure 10:
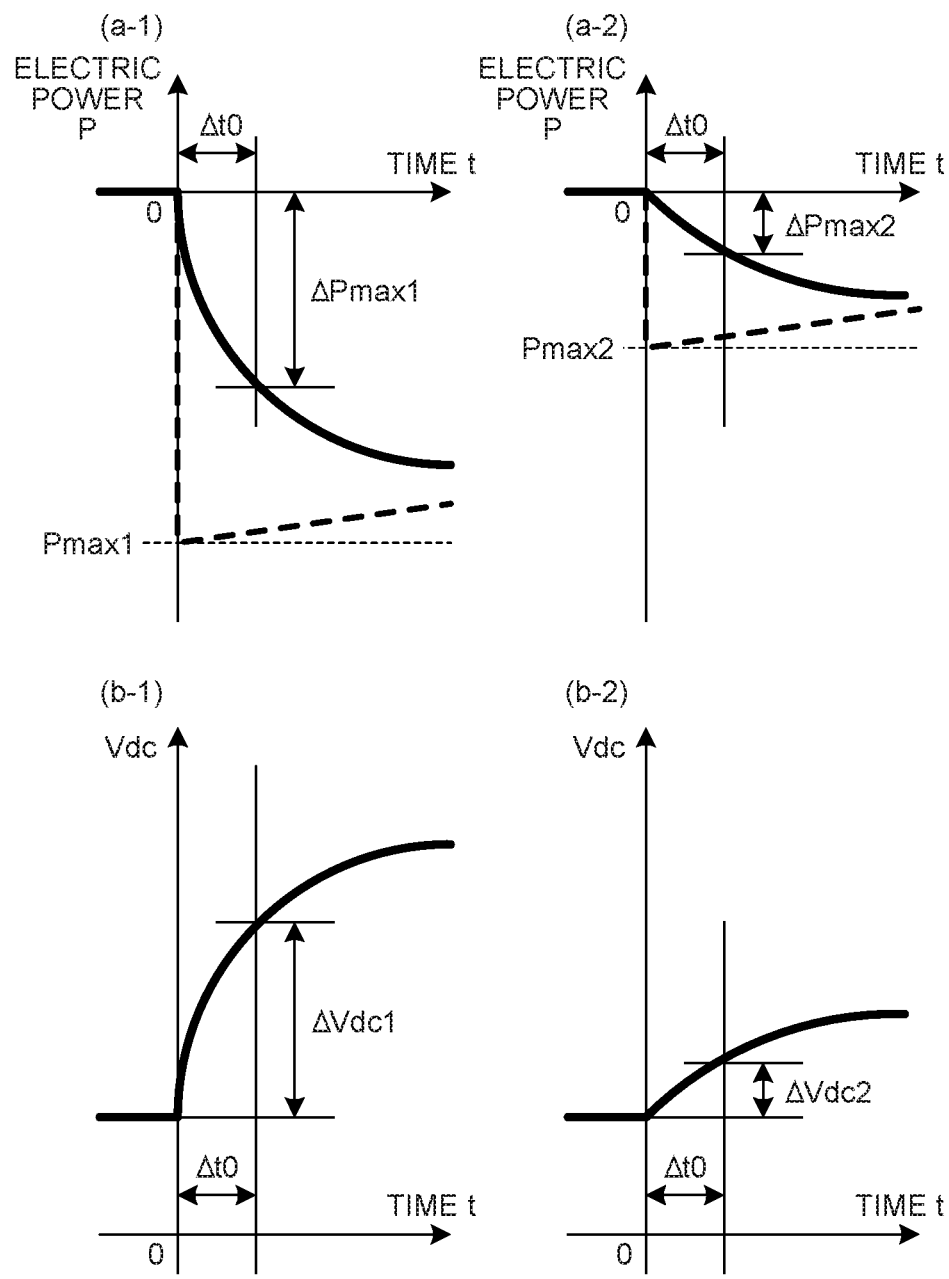
FIG. 10 is a diagram illustrating temporal changes of the electric power P and the DC bus voltage Vdc in the AC motor drive system according to the first embodiment.

FIGS. 10(a-1) to 10(b-2) are diagrams illustrating temporal changes of the electric power P and the DC bus voltage Vdc. As indicated by a broken line in FIG. 10(a), even in a change at regenerative operation start time of steep regenerative power generated, for example, when the AC motor 16 suddenly stops, a delay occurs in the actual regenerative power as indicated by a thick solid line in FIG. 10(a) because of a factor such as impedance or inductance of the inverter 14 or the DC bus 12. The rate of change of the actual regenerative power immediately after the regenerative operation start is steeper as the maximum regenerative power Pmax is larger. That is, a change in regenerative power in one unit of a control time interval immediately after the regenerative operation start indicated by Δt0 in FIG. 10(a-1) and FIG. 10(a-2) is larger when the maximum regenerative power Pmax is Pmax1 than when the maximum regenerative power Pmax is Pmax2. ΔPmax1 in FIG. 10(a-1) is larger than ΔPmax2 in FIG. 10(a-2).

Accordingly, a change in the DC bus voltage value Vdc in one unit of the control time interval immediately after the regenerative operation start indicated by Δt0 in FIGS. 10(b-1) and 10(b-2) is also larger when the maximum regenerative power Pmax is Pmax1 than when the maximum regenerative power Pmax is Pmax2. ΔVdc1 in FIG. 10(b-1) is larger than ΔVdc2 in FIG. 10(a-2).

Therefore, a unique relation is present between the maximum DC-bus voltage value Vmax and the change ΔVdc of the DC bus voltage value Vdc in one unit of the control time interval. This relation is defined by a function g(ΔVdc) indicated by the following Formula (13).

$$Vmax=g(\Delta Vdc) \quad (13)$$

When the above Formula (13) is substituted in Formula (12-6), the following Formula (14) is obtained. A function of generating the charging current value Is represented by the following Formula (14) is a function of the regeneration-time-current-command-value-integral-component-initial-value generating unit 42.

$$Is=a \cdot fc(g(\Delta Vdc))+b \quad (14)$$

However, the regeneration-time-current-command-value-integral-component-initial-value generating unit 42 operates not only at the regenerative operation start time but also at entire operation time of the AC motor drive system 1. Therefore, the left side of the above Formula (14) is preferably the regeneration-time-current-command-value integral component initial value Init, which is a candidate value of a regeneration-time-current-command-value integral component initial value, as indicated by the following Expression (15) rather than the charging current value Is at the regeneration operation initial time. The regeneration-time-current-command-value integral component initial value Init changes to a regeneration-time-current-command-value integral component initial value at the time when the regeneration-time-power-compensating-operation start signal Sa becomes valid in the second switching unit 464 in the regeneration-time-current-command-value-integral-component generating unit 46.

$$Iinit=a \cdot fc(g(\Delta Vdc))+b \quad (15)$$

Figure 11:
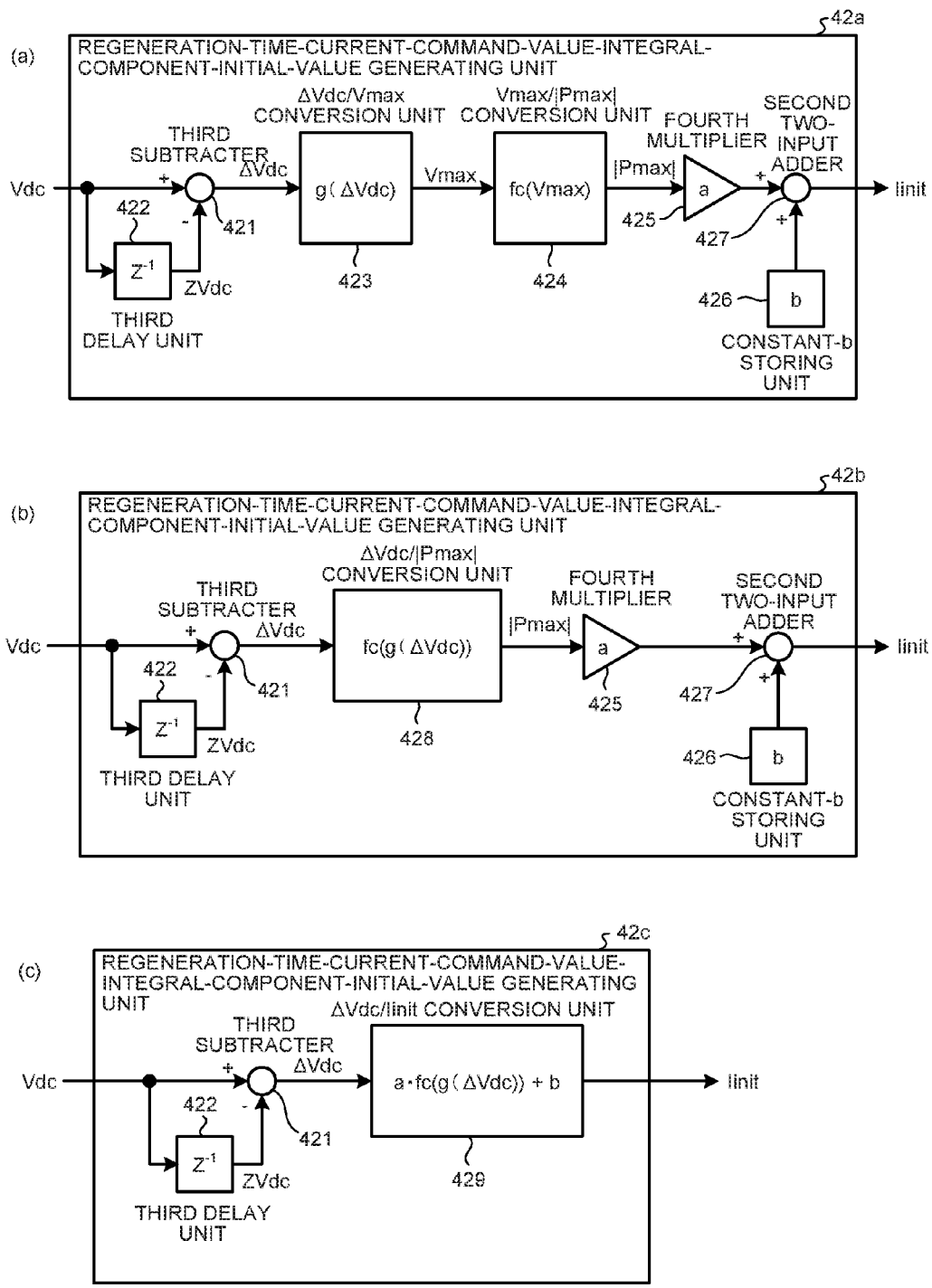
FIG. 11 is a diagram illustrating a configuration example of a regeneration-time-current-command-value-integral-component-initial-value generating unit in the AC motor drive system according to the first embodiment.

FIGS. 11(a) to 11(c) are block diagrams illustrating configuration examples of the regeneration-time-current-command-value-integral-component-initial-value generating unit 42. FIG. 11(a) illustrates a block diagram of a regeneration-time-current-command-value-integral-component-initial-value generating unit 42a. The regeneration-time-current-command-value-integral-component-initial-value generating unit 42a includes a third subtractor 421, a third delay unit 422, a ΔVdc/Vmax conversion unit 423, a Vmax/|Pmax| conversion unit 424, a fourth multiplier 425, a constant-b storing unit 426, and a second two-input adder 427. The DC bus voltage value Vdc, which is the output of the DC-voltage-value detecting unit 18, is input to the minuend terminal of the third subtractor 421 and the third delay unit 422.

The third delay unit 422 delays the input by one unit of the control time interval and outputs the input. The result obtained by delaying the DC bus voltage value Vdc by one unit of the control time interval by the third delay unit 422 is an output value ZVdc. The output value ZVdc of the third delay unit 422 is input to the subtrahend terminal of the third subtractor 421.

The third subtractor 421 generates a value ΔVdc obtained by subtracting ZVdc from Vdc and outputs the value ΔVdc. ΔVdc is input to the ΔVdc/Vmax conversion unit 423. The ΔVdc/Vmax conversion unit 423 realizes the correspondence relation indicated by the above Formula (13), for example, through reading of an LUT or calculation by using an approximation formula and outputs the estimation value of the maximum DC bus voltage value Vmax. The maximum DC bus voltage value Vmax, which is the output of the ΔVdc/Vmax conversion unit 423, is input to the Vmax/|Pmax| conversion unit 424.

The Vmax/|Pmax| conversion unit 424 realizes the correspondence relation indicated by the above Formula (12-2), for example, through reading of an LUT or calculation by using an approximation formula and outputs an absolute value |Pmax| of maximum regenerative power. The absolute value |Pmax| of the maximum regenerative power, which is the output of the Vmax/|Pmax| conversion unit 424, is input to the fourth multiplier 425.

The fourth multiplier 425 multiplies the input absolute value |Pmax| of the maximum regenerative power by a constant "a" indicated by the above Formula (12-4) and outputs the obtained value. The output value is input to one input end of the second two-input adder 427. A constant "b" is input to the other input end of the second two-input adder 427 from the constant-b storing unit 426 that stores the constant "b" indicated by the above Formula (12-5).

The second two-input adder 427 sums the output of the fourth multiplier 425 and the output of the constant-b storing unit 426 and outputs the regeneration-time-current-command-value integral component initial value Iinit indicated by the above Formula (15) to the second switching unit 464 (FIG. 7) in the regeneration-time-current-command-value-integral-component generating unit 46.

FIG. 11(b) illustrates a block diagram of a regeneration-time-current-command-value-integral-component-initial-value generating unit 42b. The regeneration-time-current-command-value-integral-component-initial-value generating unit 42b has a configuration in which the ΔVdc/

Vmax conversion unit 423 and the Vmax/|Pmax| conversion unit 424 illustrated in FIG. 11(a) are integrated and that is realized by a ΔVdc/|Pmax| conversion unit 428 that realizes the correspondence relation from ΔVdc to |Pmax|, which is a complex function fc(g(ΔVdc)), for example, through reading of an LUT or calculation by using an approximation formula and outputs |Pmax|, which is the absolute value of the maximum regeneration power Pmax.

FIG. 11(c) illustrates a block diagram of a regeneration-time-current-command-value-integral-component-initial-value generating unit 42c. The regeneration-time-current-command-value-integral-component-initial-value generating unit 42c has a configuration in which the ΔVdc/Vmax conversion unit 423 illustrated in FIG. 11(a), the Vmax/|Pmax| conversion unit 424 illustrated in FIG. 11(a), the fourth multiplier 425 illustrated in FIGS. 11(a) and 11(b), the constant-b storing unit 426 illustrated in FIGS. 11(a) and 11(b), and the second two-input adder 427 illustrated in FIGS. 11(a) and 11(b) are integrated and that is realized by a ΔVdc/Iinit conversion unit 429 that collectively realizes the correspondence relation of the above Formula (15), for example, through reading of an LUT or calculation by using an approximation formula and outputs the regeneration-time-current-command-value integral component initial value Iinit from ΔVdc in FIGS. 11(a) and 11(b).

The charging-current-command-value generating unit 4 is configured as explained above. Therefore, it is possible to calculate the DC-bus-side-charging-current command value I1*, which is a charging current command value from the smoothing capacitor 13, i.e., a DC-bus-side-charging-current command value by adopting a value based on the DC bus voltage value Vdc and a regenerative operation start time differential value as an integral component initial value of proportional integral and differential control (PID control) and using the voltage threshold VthA during regeneration as a command value and using an observation value as the DC bus voltage value Vdc.

By subjecting the charging-current-command-value generating unit 4 to the PID control and introducing an integral component initial value, for generation of steep regenerative power from the AC motor 16, it is possible to calculate a DC-bus-side-charging-current command value with high responsiveness according to the magnitude of the regenerative power.

The DC-bus-side-charging-current command value I1*, which is the output of the charging-current-command-value generating unit 4, is generated by the DC bus voltage value Vdc of the DC bus 12 and the voltage threshold VthA, which is a command value for the DC bus 12. Therefore, the DC-bus-side-charging-current command value I1* is a current command value on the DC bus 12 side of the charging/discharging circuit 15. On the other hand, for the generation of the control signal, which is the output of the charging/discharging control unit 2, the charging/discharging current value Ic, which is the output of the charging/discharging-current-value detecting unit 19, is used as the observation value. Therefore, a command value for the charging/discharging current value Ic needs to be a current command value on the power storage device 17 side of the charging/discharging circuit 15.

If a loss of the charging/discharging circuit 15 is regarded as small and neglected and a voltage value across both ends of the power storage device 17 is represented as Vcap, the relation of the following Formula (16-1) holds between the DC-bus-side-charging-current command value I1* of the charging/discharging circuit 15 and a power-storage-device-side-charging-current command value Ia*.

$$I1^* \cdot Vdc = Ia^* \cdot Vcap \tag{16-1}$$

During regenerative power compensation, the DC bus voltage value Vdc of the above Formula (16-1) is controlled to the voltage threshold VthA during regeneration. Therefore, the above Formula (16-1) changes to the following Formula (16-2).

$$Ia^* = (VthA/Vcap) \cdot I1^* \tag{16-2}$$

In the above Formula (16-2), it is necessary to always observe the both-end voltage value Vcap of the power storage device 17 and execute a division. To omit a detecting unit for the both-end voltage value Vcap of the power storage device 17 and omit the division with complicated calculation, the both-end voltage value Vcap of the power storage device 17 is substituted by a predetermined substitute both-end voltage value Vcfix. When the substitute both-end voltage value Vcfix is used, the above Formula (16-2) changes to the following Formula (16-3).

$$Ia^* = (VthA/Vcfix) \cdot I1^* \tag{16-3}$$

The substitute both-end voltage value Vcfix is not particularly limited. However, for example, it is satisfactory if a minimum that the both-end voltage value Vcap of the power storage device 17 can take is used. When the substitute both-end voltage value Vcfix is set as the minimum of the both-end voltage value Vcap, the power-storage-device-side-charging-current command value Ia* is a value larger than an original value thereof. However, the power-storage-device-side-charging-current command value Ia* sufficiently functions as a power-storage-device-side-charging-current command value according to a loss of the charging/discharging circuit 15 and a feedback function of the PID control of the charging-current-command-value generating unit 4.

Therefore, the charging-current-command-value converting unit 7 in the regeneration-time control unit 3 includes, in the charging-current-command-value converting unit 7, a substitute-both-end-voltage-value storing unit that stores an inverse 1/Vcfix of the predetermined substitute both-end voltage value Vcfix. The charging-current-command-value converting unit 7 calculates a product of three values, i.e., the inverse, the DC-bus-side-charging-current command value I1* input from the charging-current-command-value generating unit 4, and the regeneration-time-voltage threshold VthA input from the regeneration-time-power/voltage conversion unit 6 (the above Formula (16-3)) and generates the power-storage-device-side-charging-current command value Ia*. The power-storage-device-side-charging-current command value Ia*, which is the output of the charging-current-command-value converting unit 7, is output to the current-command-value integrating unit 22.

The AC motor drive system in the present embodiment explained above includes a converter that supplies DC power; an inverter that converts the DC power into AC power; a DC bus that connects the converter and the inverter; an AC motor driven by the AC power; a DC-voltage-value detecting unit that detects a DC bus voltage value on an output side of the converter; a power storage device that is charged with the DC power from the DC bus and discharges the charged DC power to the DC bus; a charging/discharging circuit connected to the DC bus in parallel with the inverter and connected between the DC bus and the power storage device, the charging/discharging circuit causing the power storage device to be charged and discharge; a charging/discharging-current-value detecting unit that detects a charging/discharging current value of the power storage device; and a charging/discharging control unit that outputs a control signal for controlling the inverter on a basis of the DC bus voltage value and the charging/discharging current value. When regenerative power from the AC motor via the inverter exceeds a predetermined power threshold, the charging/discharging control unit causes the power storage device to be charged such that the DC bus voltage value becomes a voltage threshold corresponding to the power threshold and causes a charging current at a start time of charging to the power storage device to start from a charging current value that is based on a DC bus voltage value of the DC bus.

Moreover, it is satisfactory if the charging current value at a start time of charging to the power storage device is based on an amount of change of the DC bus voltage value at a start time of charging.

Further, it is satisfactory if the charging/discharging control unit includes an integral control unit, a proportional integral control unit, or a proportional integral and differential control unit corresponding to the DC bus voltage value and the voltage threshold, and at a start time of charging to the power storage device, the charging/discharging control unit sets an integral component in the integral control unit, the proportional integral control unit, or the proportional integral and differential control unit to a value corresponding to the DC bus voltage value at the start time of charging.

The AC motor drive system in the present embodiment has effects explained below. Note that FIGS. 12(a) to 12(c) are respectively diagrams illustrating temporal changes of the regenerative power Pload(t), the DC-bus-side-charging current command value I1$i$*, and the regeneration-time-current-command-value differential component value I1$d$*.

Figure 12:
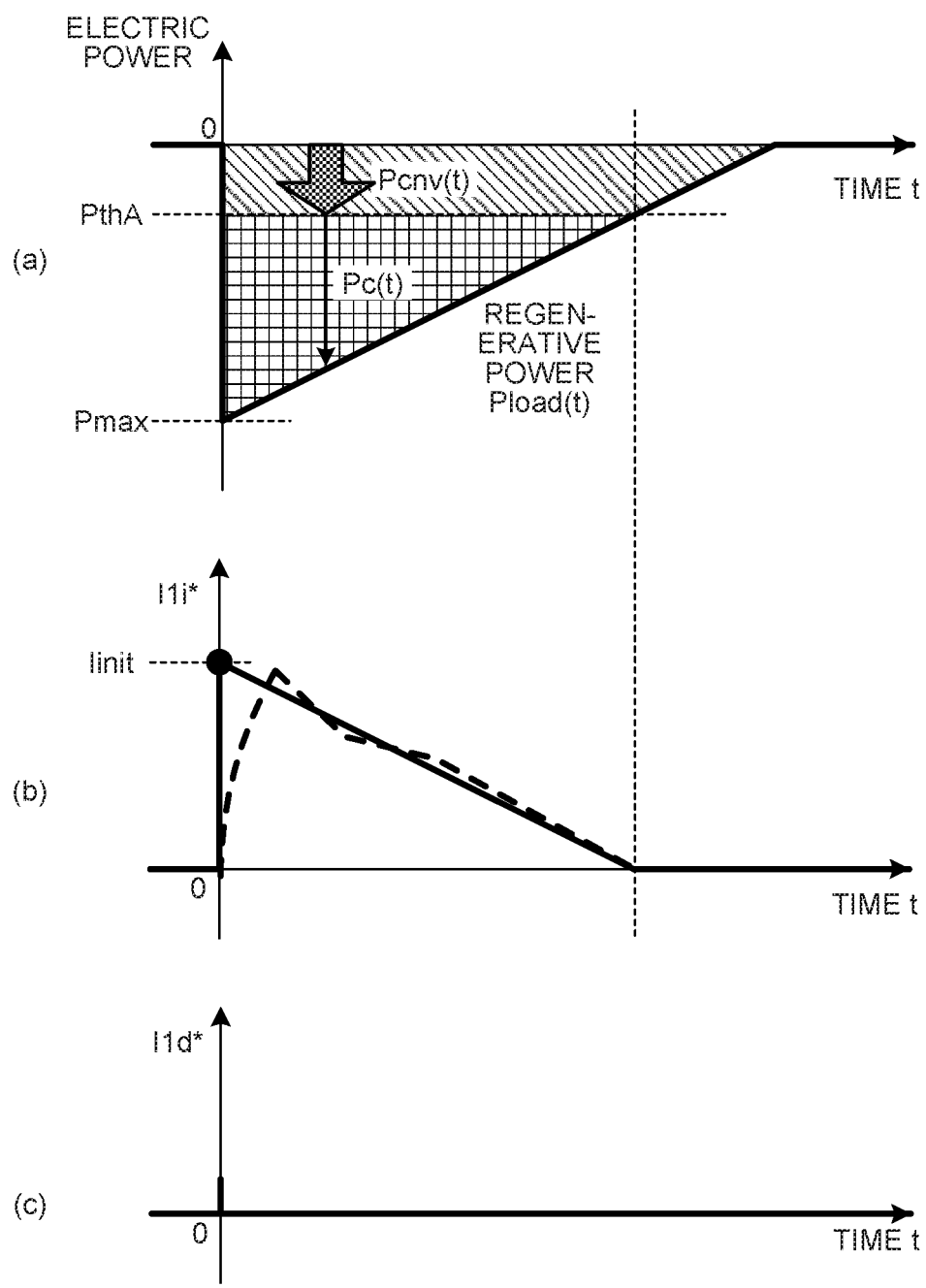
FIG. 12 is a diagram illustrating temporal changes of regenerative power Pload(t), a DC-bus-side-charging-current command value I1$i$*, and a regeneration-time-current-command-value differential component I1$d$* in the AC motor drive system according to the first embodiment.

First, according to introduction of the regeneration-time-current-command-value integral component initial value Iinit, at generation start time of steep regenerative power, whereas the regeneration-time-current-command-value integral component value I1$i$* having a delayed response as indicated by a broken line in FIG. 12(b) has to be generated in the conventional configuration, in the AC motor drive system in the present embodiment, it is possible to obtain the regeneration-time-current-command-value integral component value I1$i$* with a quick response as indicated by a solid line in FIG. 12(b) and thus it is possible to obtain a control signal with high responsiveness.

Second, the regeneration-time-current-command-value integral component initial value Iinit is generated as a value corresponding to the DC-bus-side-charging-current command value I1* at the regenerative operation start time. Therefore, because the use of a regeneration-time-current-command-value-integral-component initial value that is an unnecessarily large value can be prevented, it is possible to prevent unnecessary power supply from the system power supply at the regenerative operation start time.

Third, because the regeneration-time-current-command-value-integral-component-initial-value generating unit 42 is always operating, it is possible to prevent a large change from occurring in the regeneration-time-current-command-value integral component value I1$i$* even if the regeneration-time-power-compensating-operation start signal Sa becomes valid at time other than immediately after the regenerative operation start time and the regeneration-time-current-command-value integral component initial value Iinit is replaced by the regeneration-time-current-command-value integral component value I1$i$* and thus it is possible to obtain a control signal with high continuity. Therefore, it is possible to extend the life of the power storage device 17 and the reactor element in the charging/discharging circuit 15.

Fourth, in the generation of the regeneration-time-current-command-value integral component initial value Iinit of the regeneration-time-current-command-value-integral-component-initial-value generating unit 42, only the DC bus voltage value Vdc is used as the observation value. Thus, the current-value detecting unit of the DC bus 12 in which a large current flows is unnecessary. Therefore, it is possible to reduce the costs of the AC motor drive system, save resources by reducing the capacitance and eliminating the attachment member, and avoid a risk of uncontrollability due to the magnetic flux saturation of the current-value detecting unit.

Fifth, the configuration is such that the input to the regeneration-time-current-command-value-differential-component generating unit 47 is performed not via the first switching unit 44. Accordingly, for the generation of the regeneration-time-current-command-value differential component value I1$d$*, it is unnecessary to wait for the generation of the regeneration-time-power compensating operation flag Fa of the regeneration-time-power-compensating-operation control unit 5. Thus, it is possible to generate the regeneration-time-current-command-value differential component value I1$d$* immediately after the start of generation of electric power during regeneration. Therefore, it is possible to generate an effective control signal immediately after the start of a regeneration compensating operation.

Note that the contribution of the regeneration-time-current-command-value differential component value I1$d$* (FIG. 12(c)) to the DC-bus-side-charging-current command value I1* (a thick solid line in FIG. 12(b)) is limited and small. Therefore, with a configuration in which the regeneration-time-current-command-value-differential-component generating unit 47 is excluded from the charging-current-command-value generating unit 4, it is possible to obtain the AC motor drive system that has the first to fourth effects described above. However, the three-input adder 481 in the DC-bus-side-charging-current-command-value output unit 48 in this case is replaced by a two-input adder.

Further, within a range in which a steady error is allowed, even when both the first limiter 45 and the regeneration-time-current-command-value-differential-component generating unit 47 are omitted from the charging-current-command-value generating unit 4, it is still possible to obtain the AC motor drive system that has the first to fourth effects described above. However, in this case, the three-input adder 481 in the DC-bus-side-charging-current-command-value output unit 48 is also omitted.

Note that, in FIG. 1, it is assumed that the charging/discharging circuit 15 is a single-phase chopper. Therefore, FIG. 1 illustrates a case where there is only one charging/discharging-current-value detecting unit 19. For the purpose of suppressing a ripple of a charging/discharging current of the power storage device 17, it is also possible to configure the charging/discharging circuit 15 from a multiple-phase, i.e., n-phase chopper (n is an integer equal to or larger than 2). When the charging/discharging circuit 15 is configured from an n-phase chopper, it is possible to reduce the ripple of the charging/discharging current of the power storage device 17 to 1/n. Accordingly, because heat generation of the power storage device 17 can be suppressed, it is possible to extend the life of the power storage device 17. When the charging/discharging circuit 15 is configured from an n-phase chopper, m charging/discharging-current detecting units (m is an integer equal to or larger than 1 and equal to or smaller than n) are mounted, m charging/discharging current values are input to the control-signal generating unit 23 in the charging/discharging control unit 2, and a charging/discharging current Ic of the power storage device 17 is calculated and used.

By configuring the charging/discharging circuit 15 from the n-phase chopper, it is possible to suppress a charging/discharging current per phase; therefore, a response of a charging/discharging current to a control signal, which is an output of the charging/discharging control unit 2, becomes quick. Therefore, a response of a charging current to a control signal at the regenerative operation start time is improved compared with a response in the case of the single-phase chopper.

Note that, in the configuration illustrated in FIG. 1, the AC motor drive system can further include an auxiliary-charge control unit that generates a control signal for actuating the charging/discharging circuit 15 to charge and discharge the desired electric power to and from the power storage device 17 in a period during which the AC motor 16 carries out neither a power running operation nor a regenerative operation and when electric power during the power running operation of the AC motor 16 or electric power during the regenerative operation is smaller than a predetermined threshold. Conversely, when it is unnecessary to suppress supplied power from the converter 11 during power running, a configuration may be such that the power-running-time control unit 21 and the current-command-value integrating unit 22 explained in the present embodiment are not present.

Note that, in the present embodiment, the form is explained in which the charging/discharging control unit 2 is configured by a combination of various kinds of hardware. However, the present invention is not limited to this form. That is, a part or all of the components in the charging/discharging control unit 2 may be realized by software by which the components can be replaced.

Second Embodiment

Figure 13:
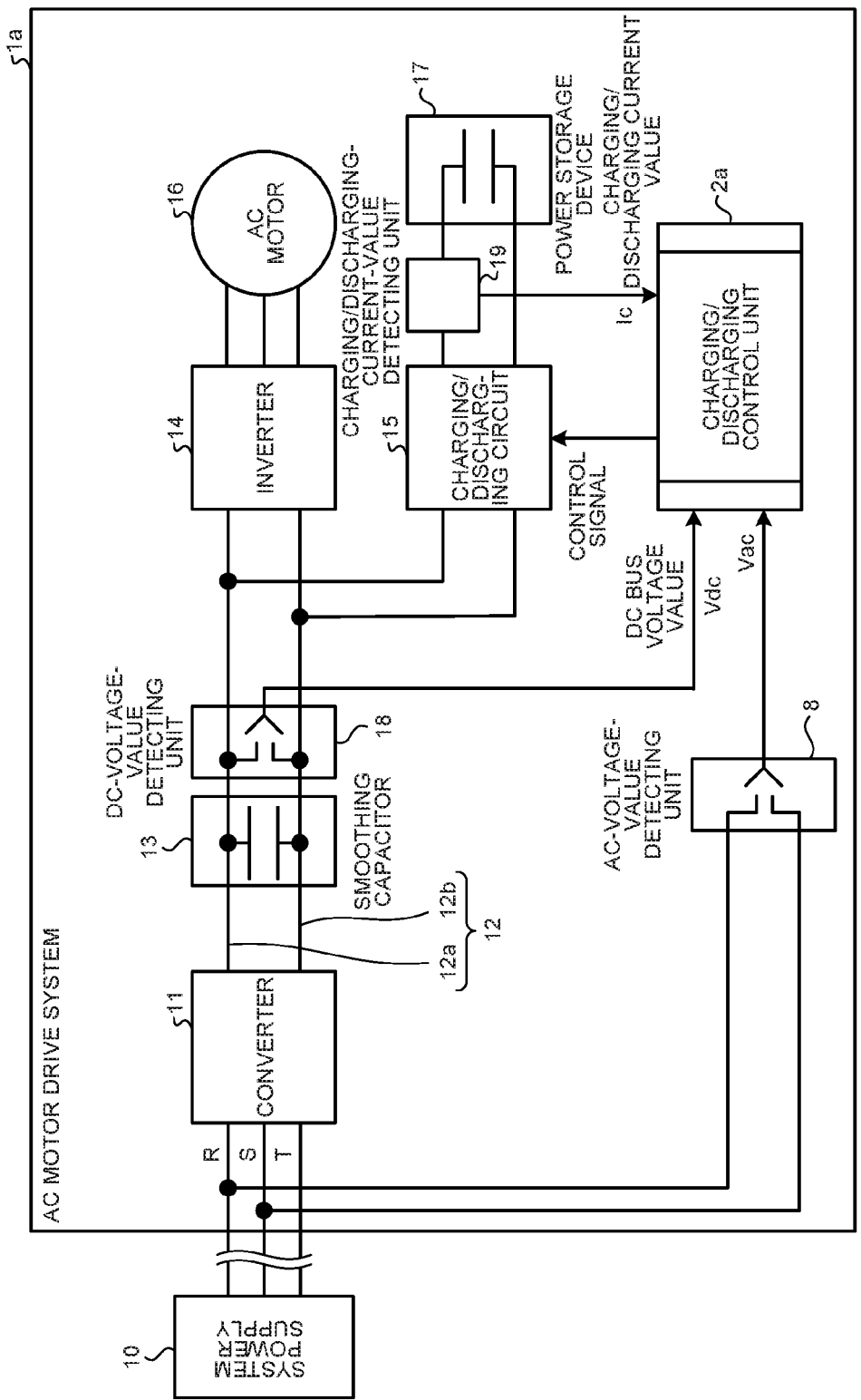
FIG. 13 is a block diagram illustrating an entire AC motor drive system according to a second embodiment.

FIG. 13 is a block diagram illustrating an entire second embodiment of the AC motor drive system according to the present invention. An AC motor drive system 1a illustrated in FIG. 13 includes a charging/discharging control unit 2a, the converter 11, the smoothing capacitor 13, the inverter 14, the charging/discharging circuit 15, the AC motor 16, the power storage device 17, the DC-voltage-value detecting unit 18, the charging/discharging-current-value detecting unit 19, and an AC-voltage-value detecting unit 8. That is, the AC motor drive system 1a illustrated in FIG. 13 is different from the AC motor drive system 1 illustrated in FIG. 1 in that the AC motor drive system 1a includes the AC-voltage-value detecting unit 8.

The AC-voltage-value detecting unit 8 detects an AC voltage value Vac, which is a voltage value between system power supply lines connected to the system power supply 10 side of the converter 11 and outputs the AC voltage value Vac to the charging/discharging control unit 2a. Note that, in the present embodiment, the same names and the reference numerals and signs are used for units same as or equivalent to the units in the first embodiment. Explanation of the units is omitted.

The AC voltage value Vac in the system power supply input to the converter 11 is different depending on the length of a wire from the system power supply 10 to the converter 11. When a plurality of AC motor drive systems are connected to the same system power supply, the AC voltage value Vac input to the converter 11 of one AC motor drive system fluctuates according to the operation states (busyness) of the other AC motor drive systems. When the AC voltage value Vac in the converter 11 fluctuates, the voltage value Vdc of the DC bus 12, which is the output of the converter 11, also fluctuates.

Even if the AC voltage value Vac of the converter 11 fluctuates, the AC motor drive system 1a in the present embodiment can suppress regenerative power regenerated via the converter 11 to the predetermined power threshold PthA during regeneration.

Figure 14:
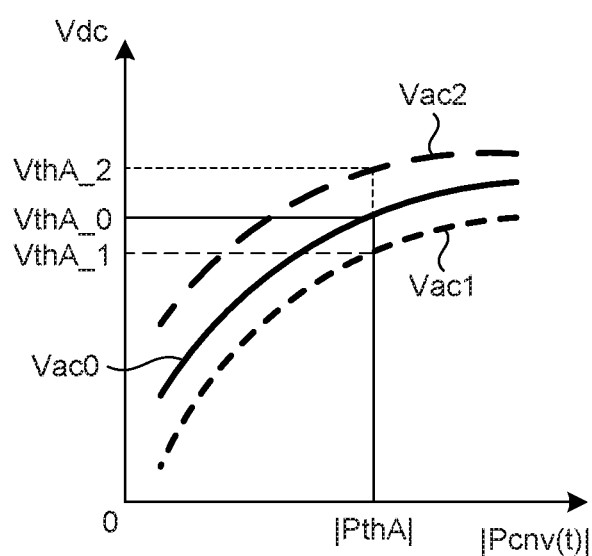
FIG. 14 is a diagram illustrating a relation between the DC bus voltage value Vdc and a regenerative power |Pcnv (t)| of a converter when a capacitance value of a smoothing capacitor is fixed and an AC motor varies an AC voltage value Vac in a regenerative operation in the AC motor drive system according to the second embodiment.

FIG. 14 is a diagram illustrating a relation between the DC bus voltage value Vdc and regenerative power |Pcnv(t)| of the converter 11 in the regenerative operation of the AC motor 16 when the capacitance value of the smoothing capacitor 13 is fixed at C and the AC voltage value Vac fluctuates. In FIG. 14, Vac1<Vac0<Vac2 is set and a relation between |Pcnv(t)| and the voltage value Vdc when the DC bus voltage value Vdc is Vac0 is indicated by a thick solid line. Similarly, when the DC bus voltage value Vdc is Vac1 and Vac2, the relation is indicated by broken lines in FIG. 14. The thick solid line and the two broken lines illustrated in FIG. 14 are substantially in a translated relation.

As it is seen from FIG. 14 as well, even if it is attempted to suppress electric power regenerated by the converter 11 to PthA, whereas the voltage threshold VthA during regeneration in the case of Vac=Vac0 is VthA_0, it is necessary to set the voltage threshold VthA during regeneration in the case of Vac=Vac1 to VthA_1 and set the voltage threshold VthA during regeneration in the case of Vac=Vac2 to VthA_2.

Therefore, in the present embodiment, the AC voltage value Vac detected by the AC-voltage-value detecting unit 8 is input to the regeneration-time-power/voltage conversion unit 6 in the regeneration-time control unit 3 in the charging/discharging control unit 2a. The regeneration-time-power/voltage conversion unit 6 in the present embodiment includes, for example, according to the capacitance value C of the smoothing capacitor 13, LUTs corresponding to the difference in the AC voltage value as illustrated in FIG. 14. Alternatively, the regeneration-time-power/voltage conversion unit 6 in the present embodiment makes use of the fact that a relation between the voltage value Vdc and |Pcnv(t)| due to the difference in the AC voltage value when the capacitance value of the smoothing capacitor 13 is the same value C is substantially in a translated relation. That is, the regeneration-time-power/voltage conversion unit 6 stores only a relation in the case of Vac=Vac0 as an LUT or an approximation formula. The output of the converting unit in the regeneration-time-power/voltage conversion unit 6 is VthA_0 in FIG. 14. An arithmetic operation indicated by the following Formula (17) is applied to the VthA_0, i.e., VthA_0 is multiplied by a constant Ka/Vac0 and further multiplied by the AC voltage value Vac from the AC-voltage-value detecting unit 8 to obtain the voltage threshold VthA during regeneration.

$$VthA = (Ka/Vac0) \cdot Vac \cdot VthA\_0 \quad (17)$$

However, a constant Ka illustrated in the above Formula (17) is a constant representing a rate of change with respect to a voltage value Vac0 serving as a reference of the AC voltage value Vac, i.e., a ratio of translation of curves in FIG. 14.

As in the first embodiment, the output of the regeneration-time-power/voltage conversion unit 6 is output to the charging-current-command-value generating unit 4, the regeneration-time-power-compensating-operation control unit 5, and a charging-current-command-value converting unit 7. Note that data obtained by multiplying VthA_0 by the constant Ka/Vac0 may be stored in the converting unit in the regeneration-time-power/voltage conversion unit 6 in the present embodiment.

According to the present embodiment, in addition to the effects of the first embodiment, even when the AC voltage value Vac, which is the voltage value between the system power supply lines on the input side of the converter 11, fluctuates, it is possible to suppress the regenerative power regenerated via the converter 11 to the predetermined threshold PthA without providing a DC-bus-current-amount detecting unit.

Figure 15:
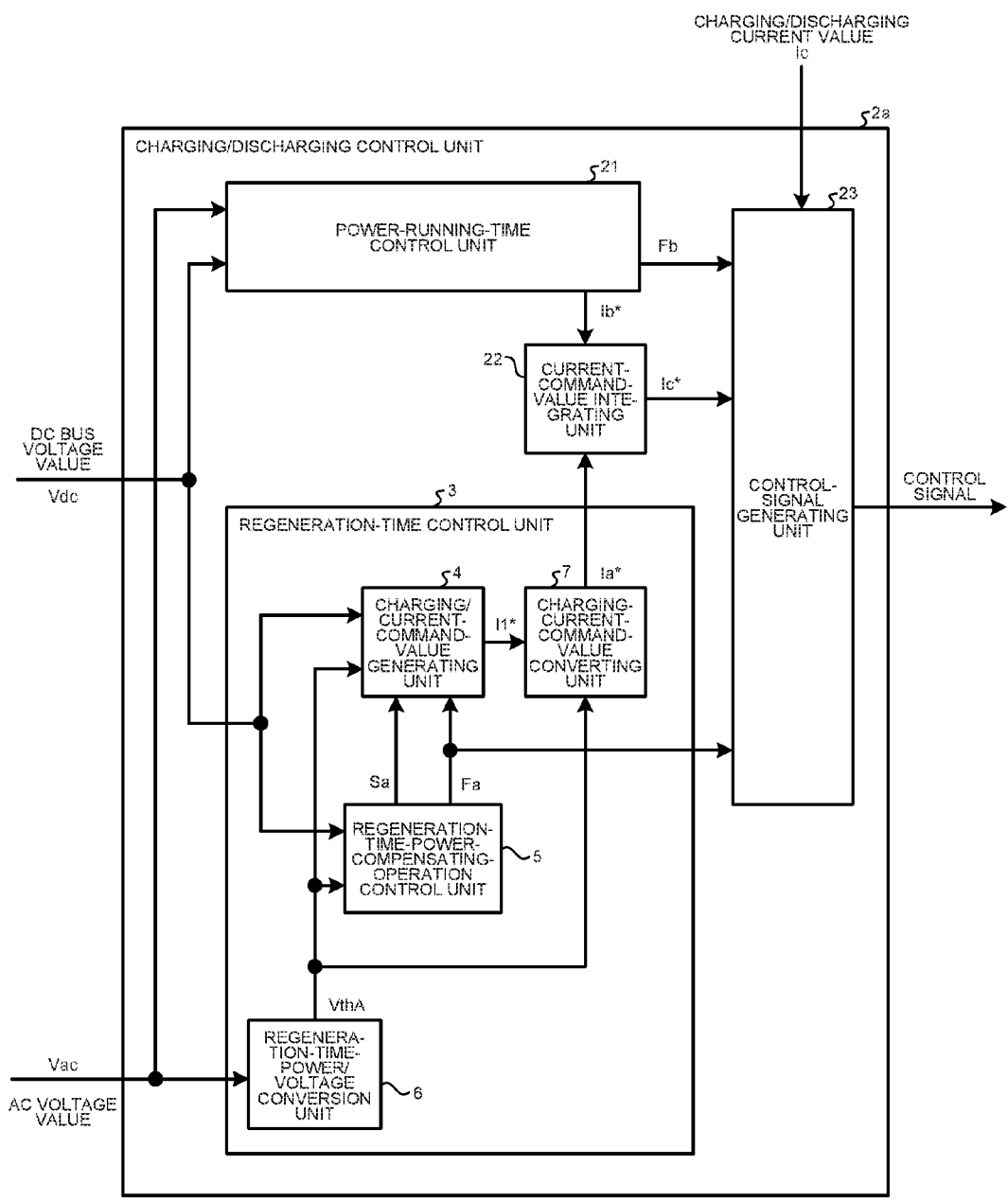
FIG. 15 is a block diagram illustrating a charging/discharging control unit in the AC motor drive system according to the second embodiment.

FIG. 15 is a block diagram illustrating the charging/discharging control unit 2a in the present embodiment. As illustrated in FIG. 15, for power peak suppression concerning a power running operation, for the purpose of coping with fluctuation in the AC voltage value Vac of the system power supply 10, the AC voltage value Vac may be input to the power-running-time control unit 21.

The AC motor drive system in the present embodiment explained above includes a converter that converts an AC current into DC power; an inverter that converts the DC power into AC power that is different from AC power input to the converter; a DC bus that connects the converter and the inverter; an AC motor driven by the AC power that is an output of the inverter; a DC-voltage-value detecting unit that detects a DC bus voltage value on an output side of the converter; a power storage device that is charged with the DC power from the DC bus and discharges the charged DC power to the DC bus; a charging/discharging circuit connected to the DC bus in parallel with the inverter and connected between the DC bus and the power storage device, the charging/discharging circuit causing the power storage device to be charged and discharge; a charging/discharging-current-value detecting unit that detects a charging/discharging current value of the power storage device; an AC-voltage-value detecting unit that detects an AC voltage value on an input side of the converter; and a charging/discharging control unit that outputs a control signal for controlling the inverter on a basis of the DC bus voltage value, the charging/discharging current value, and the AC voltage value. When regenerative power from the AC motor via the inverter exceeds a predetermined power threshold, the charging/discharging control unit causes the power storage device to be charged such that the DC bus voltage value becomes a voltage threshold corresponding to the power threshold and the AC voltage value and causes a charging current at a start time of charging to the power storage device to start from a charging current value that is based on the DC bus voltage value and the AC voltage value.

Moreover, it is satisfactory if the charging current value at a start time of charging to the power storage device is based on an amount of change of the DC bus voltage value at a start time of charging and based on the AC voltage value.

Further, it is satisfactory if the charging/discharging control unit includes an integral control unit, a proportional integral control unit, or a proportional integral and differential control unit corresponding to the DC bus voltage value and the voltage threshold, and at a start time of charging to the power storage device, the charging/discharging control unit sets an integral component in the integral control unit, the proportional integral control unit, or the proportional integral and differential control unit to a value corresponding to the DC bus voltage value at the start time of charging.

Note that a part or all of the components in the charging/discharging control unit 2a in the present embodiment can also be realized by software that can replace the components.

INDUSTRIAL APPLICABILITY

As explained above, the AC motor drive system according to the present invention is useful for an AC motor drive system that includes an AC motor connected to a system power supply and operates.

REFERENCE SIGNS LIST

1 AC motor drive system, 2 charging/discharging control unit, 3 regeneration-time control unit, 4 charging-current-command-value generating unit, 5 regeneration-time-power-compensating-operation control unit, 6 regeneration-time-power/voltage conversion unit, 7 charging-current-command-value converting unit, 10 system power supply, 11 converter, 12 DC bus, 12a high-potential-side DC bus, 12b low-potential-side DC bus, 13 smoothing capacitor, 14 inverter, 15 charging/discharging circuit, 16 AC motor, 17 power storage device, 18 DC-voltage-value detecting unit, 19 charging/discharging-current-value detecting unit, 21 power-running-time control unit, 22 current-command-value integrating unit, control-signal generating unit, 41 first subtractor, 42, 42a to 42c regeneration-time-current-command-value-integral-component-initial-value generating unit, 43 first multiplier, 44 first switching unit, 45 first limiter, 46 regeneration-time-current-command-value-integral-component generating unit, 47 regeneration-time-current-command-value-differential-component generating unit, 48 DC-bus-side-charging-current-command-value output unit, 61 regeneration-time-voltage-threshold generating/converting unit, 62 capacitance-value storing unit, 63 regeneration-time-power-threshold storing unit, 421 third subtractor, 422 third delay unit, 423 ΔVdc/Vmax conversion unit, 424 Vmax/|Pmax| conversion unit, 425 fourth multiplier, 426 constant-b storing unit, 427 second two-input adder, 428 ΔVdc/|Pmax| conversion unit, 429 ΔVdc/Iinit conversion unit, 461 second multiplier, 462 first two-input adder, 463 second limiter, 464 second switching unit, 465 first delay unit, 471 second delay unit, 472 second subtractor, 473 third multiplier, 474 third limiter, 481 three-input adder, 482 fourth limiter, 483 third switching unit.

The invention claimed is:

1. An AC motor drive system comprising:
a converter that supplies DC power;
an inverter that converts the DC power into AC power;
a DC bus that connects the converter and the inverter;
an AC motor driven by the AC power;
a DC-voltage-value detecting unit that detects a DC bus voltage value on an output side of the converter;
a power storage device that is charged with the DC power from the DC bus and discharges the charged DC power to the DC bus;
a charging/discharging circuit connected to the DC bus in parallel with the inverter and connected between the DC bus and the power storage device, the charging/discharging circuit causing the power storage device to be charged and discharge;

a charging/discharging-current-value detecting unit that detects a charging/discharging current value of the power storage device; and a charging/discharging control unit that outputs a control signal for controlling the inverter on a basis of the DC bus voltage value and the charging/discharging current value, wherein when regenerative power from the AC motor via the inverter exceeds a predetermined power threshold, the charging/discharging control unit causes the power storage device to be charged such that the DC bus voltage value becomes a voltage threshold corresponding to the power threshold and causes a charging current at a start time of charging to the power storage device to start from a charging current value that is based on a DC bus voltage value of the DC bus.

2. The AC motor drive system according to claim 1, wherein the charging current value at a start time of charging to the power storage device is based on an amount of change of the DC bus voltage value at a start time of charging.

3. The AC motor drive system according to claim 1, wherein the charging/discharging control unit includes an integral control unit, a proportional integral control unit, or a proportional integral and differential control unit corresponding to the DC bus voltage value and the voltage threshold, and at a start time of charging to the power storage device, the charging/discharging control unit sets an integral component in the integral control unit, the proportional integral control unit, or the proportional integral and differential control unit to a value corresponding to the DC bus voltage value at the start time of charging.

4. An AC motor drive system comprising:

a converter that converts an AC current into DC power;

an inverter that converts the DC power into AC power that is different from AC power input to the converter;

a DC bus that connects the converter and the inverter;

an AC motor driven by the AC power that is an output of the inverter;

a DC-voltage-value detecting unit that detects a DC bus voltage value on an output side of the converter;

a power storage device that is charged with the DC power from the DC bus and discharges the charged DC power to the DC bus;

a charging/discharging circuit connected to the DC bus in parallel with the inverter and connected between the DC bus and the power storage device, the charging/discharging circuit causing the power storage device to be charged and discharge;

a charging/discharging-current-value detecting unit that detects a charging/discharging current value of the power storage device;

an AC-voltage-value detecting unit that detects an AC voltage value on an input side of the converter; and a charging/discharging control unit that outputs a control signal for controlling the inverter on a basis of the DC bus voltage value, the charging/discharging current value, and the AC voltage value, wherein when regenerative power from the AC motor via the inverter exceeds a predetermined power threshold, the charging/discharging control unit causes the power storage device to be charged such that the DC bus voltage value becomes a voltage threshold corresponding to the power threshold and the AC voltage value and causes a charging current at a start time of charging to the power storage device to start from a charging current value that is based on the DC bus voltage value and the AC voltage value.

5. The AC motor drive system according to claim 4, wherein the charging current value at a start time of charging to the power storage device is based on an amount of change of the DC bus voltage value at a start time of charging and based on the AC voltage value.

6. The AC motor drive system according to claim 4, wherein the charging/discharging control unit includes an integral control unit, a proportional integral control unit, or a proportional integral and differential control unit corresponding to the DC bus voltage value and the voltage threshold, and at a start time of charging to the power storage device, the charging/discharging control unit sets an integral component in the integral control unit, the proportional integral control unit, or the proportional integral and differential control unit to a value corresponding to the DC bus voltage value at the start time of charging.

* * * * *